(12) United States Patent
Dickinson et al.

(10) Patent No.: US 7,546,286 B2
(45) Date of Patent: Jun. 9, 2009

(54) OFFLINE MULTI-TABLE DATA EDITING AND STORAGE

(75) Inventors: Richard L. Dickinson, Seattle, WA (US); Pavel Kouznetsov, Sammamish, WA (US); Sumit Chauhan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 169 days.

(21) Appl. No.: 11/300,728

(22) Filed: Dec. 15, 2005

(65) Prior Publication Data

US 2006/0095447 A1 May 4, 2006

Related U.S. Application Data

(63) Continuation-in-part of application No. 10/782,074, filed on Feb. 19, 2004, now Pat. No. 7,225,189.

(60) Provisional application No. 60/716,051, filed on Sep. 9, 2005.

(51) Int. Cl.
*G06F 17/30* (2006.01)
(52) U.S. Cl. ......................................................... 707/2
(58) Field of Classification Search ...................... 707/2, 707/101, 103 R; 709/227
See application file for complete search history.

(56) References Cited

U.S. PATENT DOCUMENTS

| | | | | |
|---|---|---|---|---|
| 5,121,499 A | 6/1992 | McCaskill et al. | ........... | 715/503 |
| 5,175,810 A | 12/1992 | Young et al. | ................ | 715/509 |
| 5,247,611 A | 9/1993 | Norden-Paul et al. | ....... | 707/504 |
| 5,255,356 A | 10/1993 | Michelman et al. | ......... | 707/504 |
| 5,319,777 A | 6/1994 | Perez | ........................... | 707/10 |
| 5,359,729 A | 10/1994 | Yarnell et al. | .................. | 707/2 |
| 5,396,587 A | 3/1995 | Reed et al. | .................. | 707/503 |
| 5,418,898 A | 5/1995 | Zand et al. | ................... | 707/503 |
| 5,418,902 A | 5/1995 | West et al. | ................... | 707/503 |
| 5,455,853 A | 10/1995 | Cebulka et al. | ........ | 379/201.03 |
| 5,471,575 A | 11/1995 | Giansante | .................... | 707/503 |
| 5,510,980 A | 4/1996 | Peters | ......................... | 707/503 |
| 5,535,324 A | 7/1996 | Alvarez et al. | .............. | 707/503 |
| 5,553,215 A | 9/1996 | Kaethler | ...................... | 707/503 |
| 5,598,519 A | 1/1997 | Narayanan | ................... | 707/504 |
| 5,600,584 A | 2/1997 | Schlafly | ....................... | 707/504 |
| 5,604,854 A | 2/1997 | Glassey | ....................... | 707/504 |
| 5,649,192 A * | 7/1997 | Stucky | ................... | 707/103 R |

(Continued)

FOREIGN PATENT DOCUMENTS

WO     WO 00/60484 A1     10/2000

OTHER PUBLICATIONS

Anonymous, "Method and Apparatus for Automatic Character Line Fill of Decimal Fields." IBM Technical Disclosure Bulletin vol. 36, No. 10, pp. 155-156, Oct. 1993.

(Continued)

*Primary Examiner*—Etienne P LeRoux
(74) *Attorney, Agent, or Firm*—Merchant & Gould P.C.

(57) ABSTRACT

Methods, systems and computer products are provided for allowing bi-directional communication between a database application and a remote data source and for allowing updating of data on a remote data source with data edited or created at a client site remote from the remote data source during an offline data editing or entry session via a client database application.

18 Claims, 10 Drawing Sheets

U.S. PATENT DOCUMENTS

| | | | |
|---|---|---|---|
| 5,685,001 A | 11/1997 | Capson et al. | 707/503 |
| 5,701,499 A | 12/1997 | Capson et al. | 707/503 |
| 5,708,827 A | 1/1998 | Kaneko et al. | 707/503 |
| 5,740,370 A | 4/1998 | Battersby et al. | 709/219 |
| 5,752,253 A | 5/1998 | Geymond et al. | 707/503 |
| 5,758,337 A * | 5/1998 | Hammond | 707/6 |
| 5,768,158 A | 6/1998 | Adler et al. | 716/11 |
| 5,812,983 A | 9/1998 | Kumagai | 707/503 |
| 5,819,293 A | 10/1998 | Comer et al. | 707/503 |
| 5,838,965 A | 11/1998 | Kavanagh et al. | |
| 5,881,381 A | 3/1999 | Yamashita et al. | 707/503 |
| 5,890,174 A | 3/1999 | Khanna et al. | 707/504 |
| 5,913,033 A | 6/1999 | Grout | 709/219 |
| 5,920,725 A | 7/1999 | Ma et al. | 717/181 |
| 5,926,822 A | 7/1999 | Garman | 707/504 |
| 5,944,789 A | 8/1999 | Tzelnic et al. | 709/214 |
| 5,966,716 A | 10/1999 | Comer et al. | 707/203 |
| 5,987,481 A | 11/1999 | Michelman et al. | 707/503 |
| 6,055,548 A | 4/2000 | Comer et al. | 707/538 |
| 6,055,549 A | 4/2000 | Takano | 707/503 |
| 6,070,177 A | 5/2000 | Kao et al. | 715/500 |
| 6,112,214 A | 8/2000 | Graham et al. | 707/539 |
| 6,134,552 A | 10/2000 | Fritz et al. | 707/10 |
| 6,134,563 A | 10/2000 | Clancey et al. | 707/503 |
| 6,134,583 A | 10/2000 | Herriot | 709/217 |
| 6,138,130 A | 10/2000 | Adler et al. | 707/504 |
| 6,151,601 A * | 11/2000 | Papierniak et al. | 707/10 |
| 6,151,624 A | 11/2000 | Teare et al. | 709/217 |
| 6,216,139 B1 | 4/2001 | Listou | 707/503 |
| 6,292,811 B1 | 9/2001 | Clancey et al. | 707/538 |
| 6,334,158 B1 | 12/2001 | Jenny et al. | 719/328 |
| 6,374,268 B1 | 4/2002 | Testardi | 707/205 |
| 6,477,527 B2 | 11/2002 | Carey et al. | 707/4 |
| 6,510,439 B1 | 1/2003 | Rangarajan et al. | 707/201 |
| 6,542,933 B1 | 4/2003 | Durst, Jr. et al. | 709/229 |
| 6,567,822 B1 | 5/2003 | Cudahy et al. | 707/104.1 |
| 6,640,234 B1 | 10/2003 | Coffen et al. | 707/538 |
| 6,694,321 B1 | 2/2004 | Berno | 707/101 |
| 6,785,704 B1 | 8/2004 | McCanne | 718/105 |
| 6,820,088 B1 * | 11/2004 | Hind et al. | 707/101 |
| 7,062,502 B1 | 6/2006 | Kesler | 707/102 |
| 7,139,768 B1 | 11/2006 | Janzig et al. | |
| 7,174,327 B2 | 2/2007 | Chau et al. | 707/3 |
| 2002/0049764 A1* | 4/2002 | Boothby et al. | 707/100 |
| 2002/0052769 A1* | 5/2002 | Navani et al. | 705/7 |
| 2002/0063734 A1 | 5/2002 | Khalfay et al. | |
| 2002/0087729 A1 | 7/2002 | Edgar | 709/246 |
| 2002/0184043 A1 | 12/2002 | Lavorgna et al. | 705/1 |
| 2003/0046366 A1 | 3/2003 | Pardikar et al. | 709/219 |
| 2003/0145224 A1 | 7/2003 | Bailey | 726/5 |
| 2003/0154191 A1 | 8/2003 | Fish et al. | 707/2 |
| 2003/0154197 A1 | 8/2003 | Millet et al. | 707/9 |
| 2003/0158947 A1* | 8/2003 | Bloch et al. | 709/227 |
| 2003/0159089 A1 | 8/2003 | DiJoseph | 714/38 |
| 2003/0225758 A1 | 12/2003 | Yamasaki | 707/3 |
| 2004/0001106 A1 | 1/2004 | Deutscher et al. | 345/838 |
| 2004/0039743 A1 | 2/2004 | Maleport et al. | 707/10 |
| 2004/0103365 A1 | 5/2004 | Cox | 715/503 |
| 2004/0138815 A1 | 7/2004 | Li et al. | 702/2 |
| 2004/0172424 A1 | 9/2004 | Edelstein et al. | 707/201 |
| 2004/0193969 A1 | 9/2004 | Nemoto et al. | 714/100 |
| 2004/0236777 A1 | 11/2004 | Pardikar et al. | 707/100 |
| 2005/0034064 A1 | 2/2005 | Meyers et al. | 715/513 |
| 2005/0069361 A1 | 3/2005 | Wang et al. | 400/61 |
| 2005/0080823 A1 | 4/2005 | Collins | 707/200 |
| 2005/0091253 A1 | 4/2005 | Cragun et al. | 707/102 |
| 2005/0187897 A1 | 8/2005 | Pawar et al. | 707/1 |
| 2005/0228990 A1 | 10/2005 | Kato et al. | 713/167 |
| 2006/0004815 A1 | 1/2006 | Murata et al. | |
| 2006/0020586 A1 | 1/2006 | Prompt et al. | |
| 2006/0095447 A1 | 5/2006 | Dickinson et al. | 707/100 |
| 2006/0155705 A1 | 7/2006 | Kamper et al. | 707/8 |
| 2006/0161533 A1 | 7/2006 | Selca et al. | 707/3 |
| 2006/0168325 A1 | 7/2006 | Wood et al. | 709/238 |
| 2006/0168557 A1 | 7/2006 | Agrawal et al. | 717/104 |
| 2006/0200499 A1 | 9/2006 | Bhatia et al. | |
| 2006/0242189 A1 | 10/2006 | Leetaru | 707/102 |
| 2006/0259506 A1 | 11/2006 | Kim | 707/102 |
| 2007/0005630 A1 | 1/2007 | Selca et al. | 707/102 |
| 2007/0005634 A1 | 1/2007 | Selca et al. | 707/102 |
| 2007/0038702 A1 | 2/2007 | Taylor et al. | |
| 2007/0198657 A1 | 8/2007 | Saliba et al. | 709/219 |

OTHER PUBLICATIONS

Miastkowski, S. "Excel 5.0—a Quick-start Guide to Using Excel's Powerful New Features." Macworld vol. 11, No. 10, pp. 146-151, Oct. 1994.

Microsoft Corp. Help File on 'Series' 'Repeated Entries', and 'Auto Fill' (screen shot) of Microsoft Excel 97 (1996), taken Mar. 2001, 6 pp.

Crew, Ed, ed. "Lesson in Excel 97: Lesson One . . . ", Web page tutorial on Excel 97 downloaded from pathways.uwe.ac.uk/Edict/Excel/Excel-01.asp on Mar. 29, 2002, 6 pp.

Sonic.net. "Microsoft Excel 5.0 (Tips on Using MS Excel 5.0 Repeat Entries)" downloaded from www.sonic.net/.about.sbaumann/excel.html on Apr. 2, 2002, 5 pp.

Microsoft Office 2000/Visual Basic Programmer's Guide, "Creating Dynamic Reports with Query Tables in Excel", http://msdn.microsoft.com/library/en-us/odeopg/html/deconcreatingdynamicreportswithq . . . , downloaded May 16, 2006, 2 pp.

Khor, "Microsoft Office Excel 2003 Preview", Jun. 2003, http://msdn.microsoft.com/library/en-us/odc_x12003_ta/html/odc_xlov.asp?frame=true, downloaded May 16, 2006, 19 pp.

U.S. Appl. No. 10/667,543 filed Sep. 22, 2003 entitled "Extension of Formulas and Formatting in an Electronic Spreadsheet".

U.S. Appl. No. 10/782,074 filed Feb. 19, 2004 entitled "Data Source Write back and Offline Data Editing and Storage in a Spreadsheet".

U.S. Appl. No. 11/169,856 filed Jun. 29, 2005 entitled "Modifying Table Definitions Within a Database Application".

U.S. Appl. No. 11/317,648 filed Dec. 22, 2005 entitled "Data Source Task Pane".

U.S. Appl. No. 11/231,260 filed Sep. 20, 2005 entitled "Templates in a Schema Editor".

Official Action in U.S. Appl. No. 10/667,543 mailed Feb. 15, 2006.
Official Action in U.S. Appl. No. 10/667,543 mailed Aug. 2, 2006.
Davidson, "Professional SQL Server 2000 Database Design", Wrox Press Ltd., 2001, 464 pp.

"Mapping Windows XP Professional to Your Business Needs", Microsoft: Windows XP Resource Kits, http://www.microsoft.com/resources/documentation/Windows/XP/all/reskit/en-us/Default.asp?url=/resources/documentation/Windows/XP/all/reskit/en-us/prba_dwp_tnvo.asp, printed Dec. 15, 2005, 8 pp.

Strong, Craeg, "Release Information", http://www.zope.org/Members/arielpartners/CVSFile/readme/document_view, Apr. 2003, 6 pp.

Onion, Fritz, "Understanding Paths in ASP.NET", Informit.com, http://www.informit.com/articles/article.asp?p=101145&redir=1, Sep. 2003, 4 pp.

U.S. Official Action in U.S. Appl. No. 11/169,856 mailed Oct. 3, 2007.

U.S. Office Action in U.S. Appl. No. 11/231,260 mailed Oct. 16, 2007.

PCT International Search Report in PCT/US2007/002662 mailed Jul. 5, 2007.

U.S. Official Action in U.S. Appl. No. 11/317,648 mailed Apr. 17, 2008.

U.S. Official Action in U.S. Appl. No. 11/343,957 mailed Jan. 15, 2008.

U.S. Official Action in U.S. Appl. No. 11/231,260, Selca et al, mailed Jul. 18, 2008.

U.S. Official Action in U.S. Appl. No. 11/169,856, Selea et al, mailed Jul. 21, 2008, 7 pgs.

U.S. Official Action in U.S. Appl. No. 11/231,260, mailed Jan. 12, 2009, 38 pgs.

\* cited by examiner

OFFLINE MULTI-TABLE DATA EDITING AND STORAGE

CROSS-REFERENCE TO RELATED APPLICATIONS

This patent application claims priority to U.S. Patent Application Ser. No. 60/716,051 filed Sep. 9, 2005, entitled "Offline Multi-Table Data Editing and Storage System," and is a continuation-in-part of U.S. patent application Ser. No. 10/782,074, filed Feb. 19, 2004, entitled "Data Source Write Back and Offline Data Editing and Storage in a Spreadsheet," the disclosures of which are expressly incorporated herein by reference.

BACKGROUND

According to typical database applications, users may work on data maintained at a remote data source (for example, a remote server) during an online session in which the client database application has an active connection with the server. Unfortunately, if the connection between the client application and remote data source is lost or is disconnected, editing of remotely stored data is terminated, and changes made to data stored at the client side may not be saved back to the remote data source once a connection with the remote data source is reestablished.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aide in determining the scope of the claimed subject matter.

Embodiments of the present invention solve the above and other problems by providing methods, systems, and computer products for updating data on a data storage source or site with data edited or created at a client site remote from the data storage site during an offline data editing or entry session via a client database application.

According to aspects of the invention, a request for data is passed from a client database application to a remote data source during an online data retrieval and editing session. At the client application, data responsive to the request is received and is stored at a local site. During an offline session, the stored data may be edited. As the data is edited, a change log is generated to track changes made to the data. For multiple related lists of data, a relationship tree or graph is generated to track relationships between related lists of data edited during the offline session.

Upon initiation of a subsequent online session, the edited data may be passed from the client application to the remote data source for synchronizing the edited data with data currently stored at the remote data source. The edited data is passed from the client application to the remote data source in a hierarchical order according to the relationship graph or tree generated for the edited data. The change log is passed to the remote data source with the edited data for identifying changes made to the data during the offline data editing or entry session. At the remote data source, the edited data is compared with data presently stored at the remote storage site. If a version of the edited data differs from a version of the data presently stored at the remote data source, an error is generated at the client application. In response to the version error, the edited data may be used to update the data currently stored at the remote data source, or the edited data may be discarded so that the data currently stored at the remote data source is not changed.

According to another aspect of the invention, when the data is edited during the offline session, temporary row identifications are assigned to new rows of the edited data. If the edited data is saved to the remote data source, the temporary row identifications are replaced with permanent row identifications, and the permanent row identifications are saved to the remote data source with the edited data.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to methods, systems and computer products for allowing bi-directional communication between a database application and a remote data source and for allowing updating of data on a remote data source with data edited or created at a client site remote from the remote data source during an offline data editing or entry session via a client database application.

In the following detailed description, references are made to the accompanying drawings that form a part hereof, and in which are shown by way of illustration specific embodiments or examples. These embodiments may be combined, other embodiments may be utilized, and structural changes may be made without departing from the spirit or scope of the present invention. The following detailed description is, therefore, not to be taken in a limiting sense and the scope of the present invention is defined by the appended claims and their equivalents.

Figure 1:
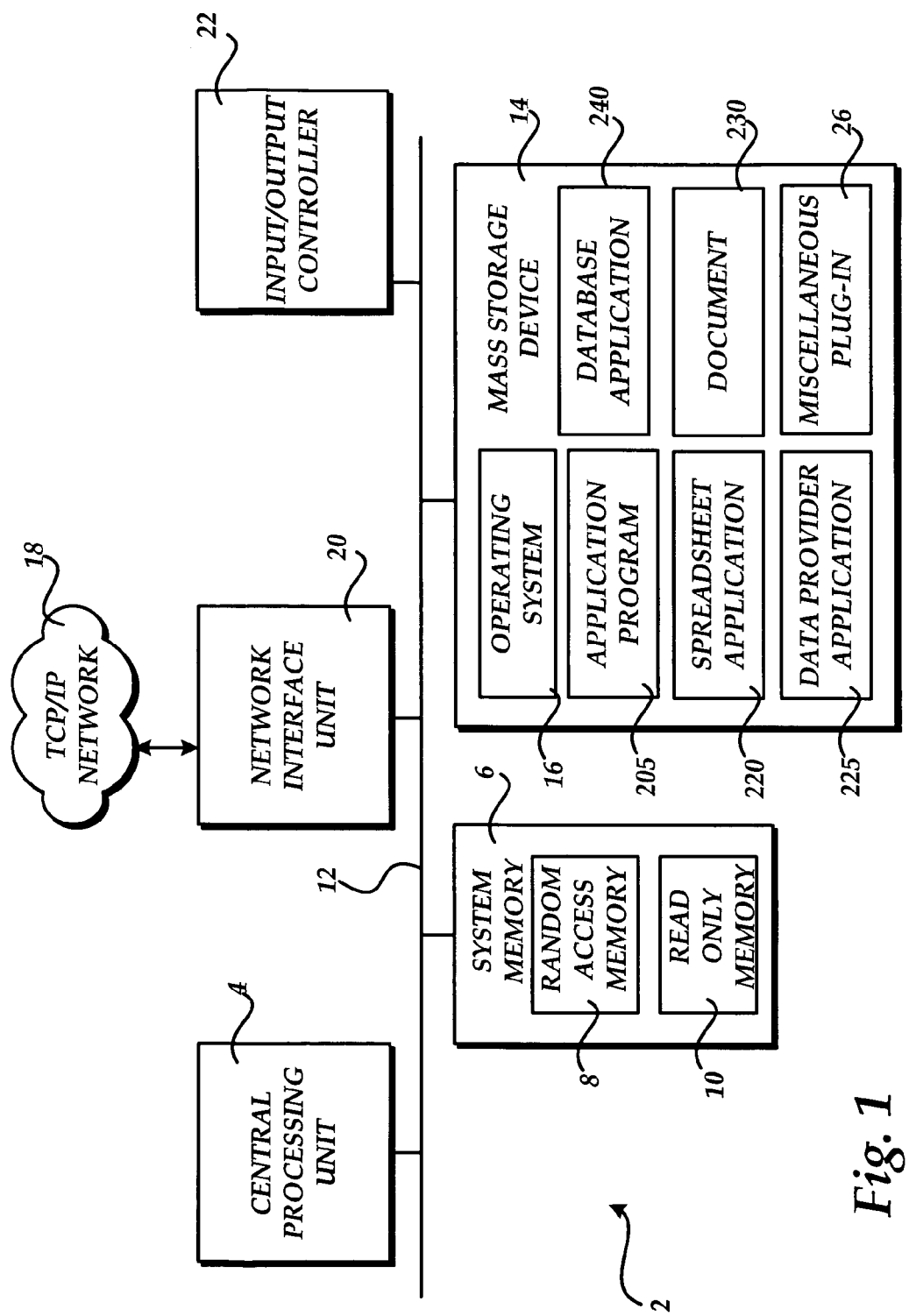
FIG. 1 is a block diagram showing the architecture of a personal computer that provides an illustrative operating environment for embodiments of the present invention.

Referring now to the drawings in which like numerals represent like elements throughout the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, the spreadsheet program 220, the data provider application 225, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS® operating system from MICROSOFT CORPORATION of Redmond, Wash. The mass storage device 14 and RAM 8 may also store one or more application programs. In particular, the mass storage device 14 and RAM 8 may store an application program 205 for creating and editing an electronic document 230. For instance, the application program 205 may comprise a word processing application program, a spreadsheet application, a contact application, and the like. Application programs for creating and editing other types of electronic documents may also be used with the various embodiments of the present invention. Other application programs may be stored and utilized by the computer 2, such as the spreadsheet application 220 and the database application 240, described below.

Bi-Directional Communication Between Spreadsheet and Data Source

Figure 2:
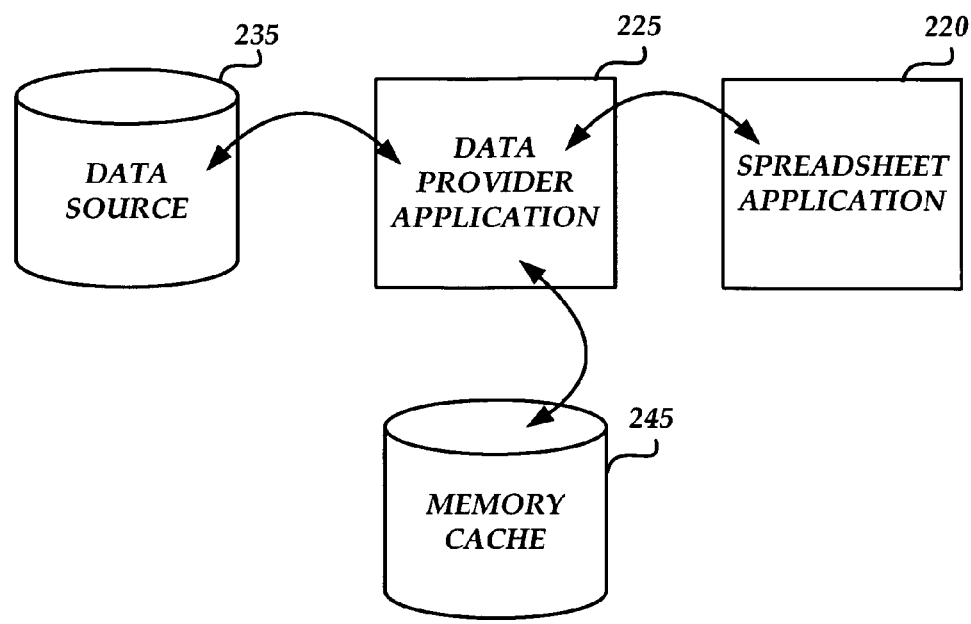
FIG. 2 is a simplified block diagram illustrating interaction between a spreadsheet application worksheet, a data provider application and a data source according to embodiments of the present invention.

FIG. 2 is a simplified block diagram illustrating interaction between a spreadsheet application worksheet, a data provider application and a data source according to embodiments of the present invention. As briefly described above, embodiments of the present invention provide for bi-directional communication between a spreadsheet application 220 and a remote data source 235 via a data provider application 225. As will be described in detail below, data may be published from the spreadsheet application 220 to a remote data source 235 via the data provider application. Data may likewise be imported from the data source 235 to the worksheet 220. The spreadsheet application 220 may be edited in an offline environment followed by reconnection to the data source 235 at which time modified data may be exported from the spreadsheet application 220 to the data source 235. Conflicts between data exported from the spreadsheet application 220 and data resident on the data source 235 may be resolved, and error conditions created by attempted publication of data from the spreadsheet application 220 to the data source 235 may be highlighted to the user.

The spreadsheet application 220 is illustrative of any suitable spreadsheet application for organizing, calculating, manipulating and presenting various types of data. An exemplary spreadsheet application for use in accordance with embodiments of the present invention is EXCEL® manufactured by MICROSOFT CORPORATION of Redmond, Wash. The data source 235 is illustrative of any database for importing, exporting and maintaining data in various forms, including tabular form, cell form, row form, column form, and the like. Suitable databases include SQL Server databases and Windows SharePoint Services databases (hereafter SharePoint) manufactured by Microsoft Corporation of Redmond, Wash.

The data provider application is a software application module operatively residing between the spreadsheet application and the data source 235. The data provider application is a software module containing sufficient computer executable instructions, which when executed by a computer 2, illustrated in FIG. 1, perform the functions described herein. The data provider application 225 may operate as a standalone software application, which may be called upon by the data source 235 or spreadsheet application 220 as described herein. Alternatively, the data provider application 225 may be integrated with the spreadsheet application 220. According to one embodiment of the present invention, the data provider application 225 is integrated with the spreadsheet application and is comprised of one or more dynamically-linked library (DLL) modules, which may be called upon by the spreadsheet application 220 and the data source 235 for performing the functionality described herein. The data provider application may be associated with or integrated with other applications, such as a database application described below. Referring still to FIG. 2, the memory cache 245 is illustrative of a memory context for storing cached data and error information passed between the spreadsheet application 220 and the data source 235.

Communication between the spreadsheet application 220 and the data source 235 via the data provider application 225 is accomplished through any suitable computer-enabled communication protocol that allows bi-directional communication between the spreadsheet application and the data source 235 via the data provider application. According to one embodiment of the present invention, the communication protocol used between the spreadsheet application and the database is the OLE-DB communication protocol. Other suitable communication protocols include SOAP, ODBC, XML web services, remote procedure calls (RPC), ADO, and the like.

In order to establish bi-directional communications between the spreadsheet application 220 and the data source 235, a communication link must first be established between the spreadsheet application and the data source through the data provider application. Generally described, the spreadsheet application may connect to the data source at the database 235 in order to push data out to the database 235, as described herein. Alternatively, the spreadsheet application may establish a link with the database and request data from the database. Alternatively, the database 235 may establish a communication link with the spreadsheet application 220 via the data provider application, and the spreadsheet application may then push data to the database 235 and pull data from the database 235.

Figure 3:
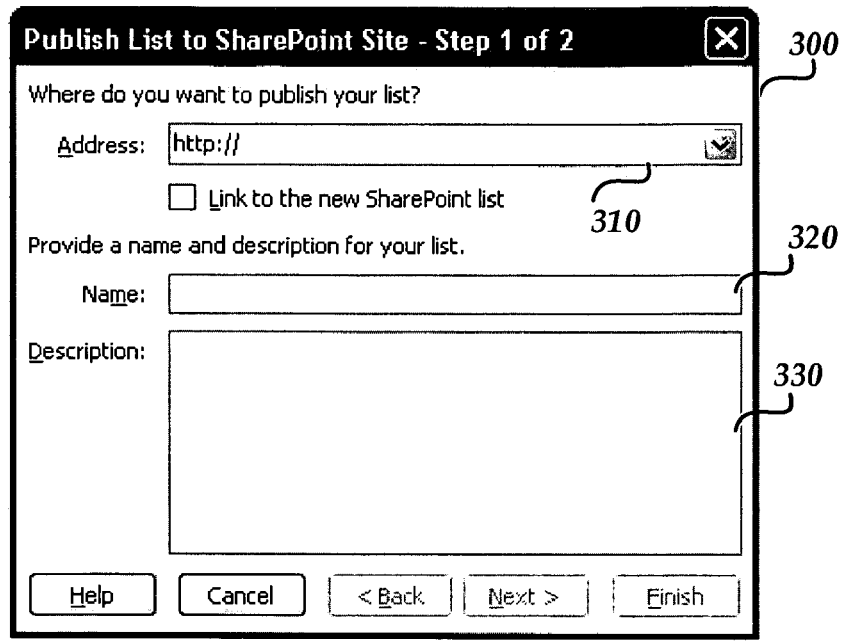
FIG. 3 illustrates an example computer screen display showing an illustrative dialog box for publishing data to a data source.

FIG. 3 illustrates an example computer screen display showing an illustrative dialog box for publishing data to a data source. According to an embodiment of the present invention, a communication link between the spreadsheet application 220 and the database data source 235 may be established by publishing data from the spreadsheet application worksheet to the database 235. According to one embodiment, the example dialog box 300 may be launched by the spreadsheet application 220 for allowing the user to establish a communication link with the database 235 to export data to the database. Referring to FIG. 3, a URL field 310 allows the user to provide the URL for a particular data source location, such as a particular SharePoint server. A Name field 320 is provided for allowing the user to specify the name of a particular data list contained in the database 235. An optional Description field 330 allows a user to provide descriptive information associated with the data as it will be published to the database 235.

Figure 4:
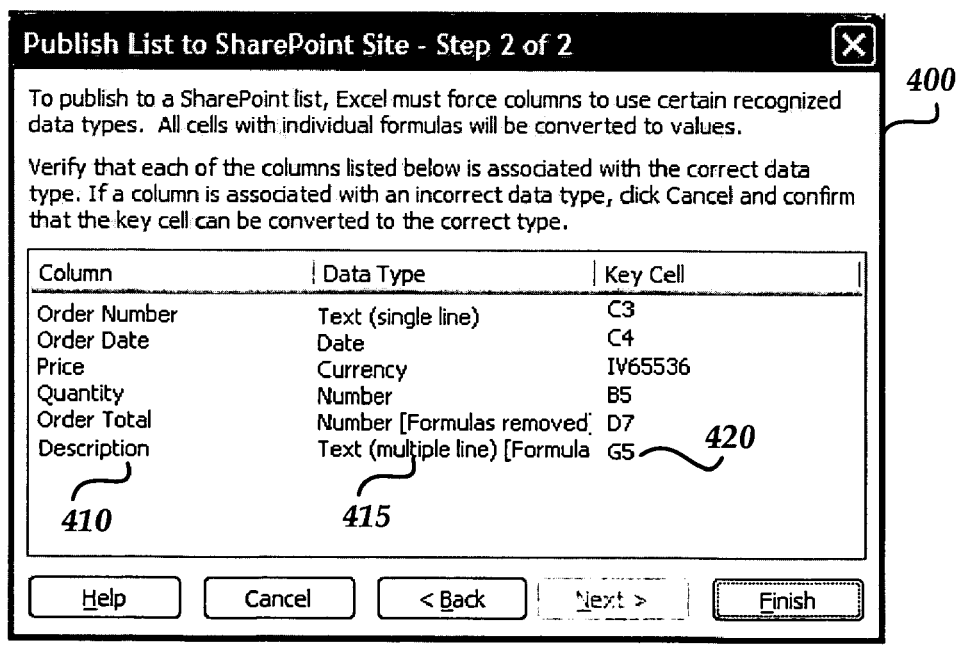
FIG. 4 illustrates a computer screen display showing an illustrative dialog box for publishing data to a data source.

Once the user submits the dialog box 300, the user may be provided with the dialog box 400 illustrated in FIG. 4 to allow the user to confirm the column and data type information associated with data to be published to the database 235. A list of columns associated with data to be published to the database 235 is shown under the Column heading 410. A list of associated data types is shown under the Data Type heading 415.

If the user confirms the data to be published to the database 235, the data is passed from the spreadsheet application 220 to the data provider application 225 where it is cached in the memory cache 245 by the data provider application 225. The data provider application 225 compares the cached data against data contained in the database 235 to which the cached data is to be published. If the data provider application determines that the cached data may be published to the database 235 without error, the data is published to the database 235 successfully, and the user is alerted as to the successful data publication. Thus, a data communication link is established between the spreadsheet application worksheet and a particular data source in the database 235. As should be understood, data publication errors can occur at anytime during the publication operation as opposed to only at the initial phase of publication.

Data Type Mapping and Database Rules Mapping

Successfully importing and exporting data to and from the spreadsheet application 220 and a particular data source (database) after a communication link has been established requires data type mapping and data rules mapping between the spreadsheet and the data source. That is, there is a definitive mapping between spreadsheet data and the data types and data rules allowed by and governing a given database system. Anytime a spreadsheet publishes data to a given data source of a given database system, whether upon an initial upload of data or during any subsequent synchronization between the spreadsheet and the data source, the data type mapping and data base rules must be followed. Data Validation is a combination of efforts from data type mapping which provides a heuristic to map a data source's native data types to a spreadsheet presentation and data validation which allows us to enforce the data integrity rules of a given data source (database). According to an embodiment of the present invention, the data validation model or schema described herein is refreshed each time data in the spreadsheet is refreshed from the data source. This means that data validation (data type mapping and data rules mapping) gets refreshed from the data source each time the user elects to synchronize the data between the spreadsheet and the data source.

Different data sources have different supported data types. This section is an illustration of the possible mapping between an exemplary Microsoft Excel spreadsheet and the data types supported in Windows SharePoint Server data source. As should be understood by those skilled in the art, the following discussion is for purposes of illustrating data validation between a given data source and a given spreadsheet and is not meant to restrict operation of the present invention to this specific spreadsheet application and this data source application. Instead, the following discussion is intended to provide an example operation of the present invention in terms of a specific spreadsheet application and a specific data source.

An Excel spreadsheet application 220 supports recognition of the following data Types.

Short Text—a value expressed in a string <256 characters

Multi-line text—text with >255 characters or contains a carriage return or line feed (CR/LF).

Number—a number

Date—the cell number format is a date or date/time format or a custom format involving year/month/day.

Currency—the cell number format is a currency or accounting format or a custom number format involving a currency symbol (including 3 letter locale currency symbols).

Hyperlink—a cell recognized by Excel's existing hyperlink features to be a hyperlink.

Boolean—a cell recognized in Excel as VT_Boolean.

Percentage—a cell containing a number and formatted as Percentage.

Data types not mentioned above may be considered "short text" data types for the purposes of list column data type determination.

Figure 4A:
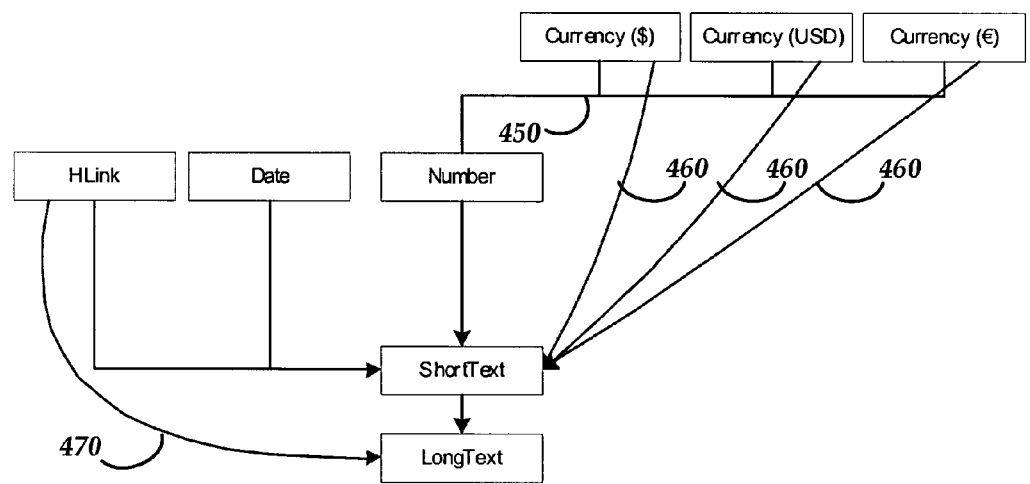
FIG. 4A is a block diagram illustrating a "best" data type selection by an exemplary spreadsheet application.

According to one embodiment, for each data cell in a column, the spreadsheet application guesses its best data type. If all the cells in a column have the same (best guess) data type, then the spreadsheet application makes that the data type of the column. If the column has cells of various data types, then spreadsheet application picks a lower fidelity data type. Referring to FIG. 4A, an illustration is presented showing how a "best" data type may be selected by an Excel spreadsheet. Note in FIG. 4A that "LongText" in this diagram is MultiLineText. Percentage is a peer to Currency. Boolean is a peer to Date. The diagram illustrated in FIG. 4A indicates the supported reductions from one data type to another. For example lines 450 are used if there are no other cells in the list column to be reduced to Number. In other words, if there are currencies of various locales, then the best data type is Short-Text to support them all. Lines 460 represent an alternative to the lines 450 when more than one currency is being used. Line 470 is used when a hyperlink is >255 characters.

To find the data type of a column, look through the cells in the column, making a best guess of their individual data type. Then find the nearest data type to which the spreadsheet application supports reduction of all the data types found in the column. For example, say a column contains individual cells that could best be typed as Number, Currency ($) and Currency (€). The best data type for the column would be ShortText, because the two different Currency cells would necessitate using lines 460, illustrated in FIG. 4A, to Short-Text to preserve the most significant currency type of each cell. For another example, say a column contained MultiLine-Text and Number. The best data type then would be Multi-LineText. For another example, say a column contained HLink, and Number. The best data type would be MultiLine-Text or ShortText depending on the character length of the longest HLINK URL.

The following is a brief discussion of particular data type conversions between data types in a spreadsheet and data types in a given data source. For conversion of a number in a spreadsheet cell to text for a data source, for example a Share-Point List, the cell number formatted display text for that cell may be used for the data source. For currency, the displayable text for a currency cell may be converted into text for the data source and, the international markings for a currency may be preserved when converted to text. This includes the locale specific currency symbols, such as the €, as well as the three letter locale abbreviation, and current decimal separators. For conversion of percentages to text, the percentage in a spreadsheet cell is converted to text for a data source location, for example a SharePoint List, and the cell number formatted display text is used for that cell. According to one embodiment, the formatting specified decimal places may be used.

When a hyperlink in a cell is converted to text for a data source, the URL of the Hyperlink may be used. It is possible to have a hyperlink longer than 255 characters and therefore might necessitate the Multi-line text data type. The Hyperlink( ) function can result in a hyperlink value recognized by the spreadsheet application. If the formula is ignored, the hyperlink value or a converted Text version is sent to the data source. For date to text conversions, a date in a cell is converted to text for a data source, for example a SharePoint List, and the formatted display text for a date is used. Empty cells may be converted to empty strings for text or hyperlink data types. Alternatively, empty cells may be converted to zero. According to one embodiment, for date formatting, a zero is Jan. 1, 1900. According to an embodiment, if the user is using the 1904 date system (Tools/Options/General), dates are converted to 1900 date serial number before sending the date to the data source. For example, 1462 is added to the 1904-based date (the difference from 1904 date system and 1900 date system. For a linked list, the data source may send 1900 date system serial numbers back to the spreadsheet. The spreadsheet will convert the 1900 dates back to 1904 serial numbers when refreshed on a spreadsheet workbook with the 1904 date system.

For other data type categories not mentioned above, the spreadsheet cells may be considered as text cells, and the displayable text for a given cell may be exported to the data source. That is, the text that is shown in the spreadsheet cell for a number, for example and not the unformatted number shown in the formula bar. Different Data Sources have different column requirements. For example, Microsoft Share-Point has a limit of columns of a particular data type. After the spreadsheet application 220 determines the data types for each column, as described above, if the spreadsheet application finds the maximum of any data type exceeded, the spreadsheet application may warn the user appropriately during publishing if data to the data source as described above with respect to FIGS. 2, 3 and 4. According to an embodiment, for optimization purposes, the data type determination may be run before providing the user the dialog illustrated in FIG. 3. That is, if the maximum number of a data type is exceeded, for example, a warning may be immediately provided to the user so that the user does not needlessly attempt to publish data erroneously.

Columns beyond the maximum allowed may be labeled as data type "[Not Assigned]" in the Data Type column of the list view of the Publish to SharePoint wizard, illustrated above with respect to FIGS. 3 and 4. The "Please confirm . . . " label will be replaced with "This list exceeds the maximum number of <datatype> columns are available in your data source. You must modify the list before exporting to the data source. Please choose Cancel." The <datatype> is replaced with the name of the data type. The Back, Next, and Finish buttons may be disabled. The first data type column count that overflows is described in this warning message. According to one embodiment, in the event that more than one data type column count is exceeded, the user may not be directly notified in this label until he/she fixes the first data type problem and returns to the dialog. However, the user can see exactly which columns are beyond the maximum allowed for any data type by looking for "[Not Assigned]" in the Data Type column of the list view.

Different data sources also have different supported sets of data types each bringing their own user expectations. For purposes of illustration, the following discussion details an implementation for Microsoft SharePoint data source, but the method can be easily carried over to other data sources. To ensure a good experience editing lists in the spreadsheet, for example Microsoft Excel, the SharePoint data types on List ranges must be supported and enforced. A lack of enforcement would result in errors when synchronizing the list data from the spreadsheet with the data in the data source. For example, the data types supported by Microsoft SharePoint include single line of text; multiple lines of text; number (min/max, decimal places, show as percentage); currency (min/max, decimal places, show as percentage, currency format); date and time (date/time format); lookup(information on SharePoint site); choice(single and multiple); Yes/No (checkbox); Hyperlink; calculated column; attachment; and scale/matrix. Each of the above types will be mapped to a combination of validation and formatting in the spreadsheet application.

For purposes of illustration, Table 1 below lists Data Types available in Microsoft SharePoint version 2, along with the format and validation that the data type will be mapped to in Microsoft Excel. Below the table is a section for each data type with additional information.

TABLE 1

| Data Type | Format | Validation |
|---|---|---|
| Single line of text | Text Number Format General Alignment | <=255 Characters (127 DBCS) |
| Multi-Line Text | Text Number Format General Alignment Row Height Wrap text on | <32767 characters (Excel's Limit) (SharePoint supports $2^{30} - 1$) |
| Number | Number type with thousands separator General Alignment. | Current Excel Limits <=1.79769313486231E308 >=2.2250738585072E-308 (Sharepoint - Float number limitations) |
| Currency | Accounting Format with Symbol General Alignment | Current Excel limits. <=1.79769313486231E308 >=2.2250738585072E-308 (Sharepoint - Float number limitations) |
| Date/Time | Date or Data and Time format (display ##### for pre-1900 dates) General Alignment | >=Jan. 1, 1753, <=Dec. 31, 8999 Feb. 29, 1990 is a valid date in Excel, but invalid on SharePoint. We will not prevent users from entering this date in Excel, but it may get rejected when the record is committed. |
| Checkbox (Yes/No) | General Number format General Alignment | =True or =False |
| Calculated | Number format is based on the data type the user indicated that the formula returns. General Alignment | Must refer to cells in same row. Limited to subset of functions |
| Hyperlink | General Alignment General Number format Displayed as Hyperlink Max length of 255 for each description and URL | URL must start with one of the following protocols. If not, it is rejected to avoid security holes. (leading spaces should be trimmed) The protocols are: mailto: http:// file:// file:\\\\ ftp:// https:// gopher:// wais:// msn: news: nntp: mid: cid: prospero:// telnet:// rlogin: tn3270: pnm:// (Real Audio media) mms:// (Media Server media) outlook: |
| Attachment | Hidden in Excel | Hidden in Excel |
| Choice - Single | Text Number format General Alignment | List validation (shown as dropdown) <=255 characters |
| Choice - Multi | Text Number format General Alignment | List validation (shown as dropdown with multi-select) <=255 characters? |
| Lookup - Single | General number format General Alignment | List validation (shown as dropdown with multi-select). <=255 characters when in a document library otherwise <=32767 characters. |
| Scale/Matrix | Hidden in Excel | Hidden in Excel |

Each data type has additional options including validation, default value, and whether the field is required. Table 2 below identifies the options for each data type. These options are selected as part of setting or changing the data type for Microsoft SharePoint.

TABLE 2

| Data Type | Type Options | Default value? | Required to contain value? | Validation allowed |
| --- | --- | --- | --- | --- |
| Short Text | Max Size | Allowed | Allowed | Max Characters |
| Multiple Lines of Text | Rich Text # of Lines to show | Not Allowed | Allowed | None |
| Number | Show as percentage (auto, 1-5) Number of decimal places | Allowed | Allowed | Min Max |
| Currency | Currency type Number of decimal places | Allowed | Allowed | Min Max |
| Date/Time | Display Type: Date Only, Date Time | Allowed (None, Today, specific date) | Allowed | N/A |
| Choice (single, no fill-in) | SharePoint allows dropdown or radio button option. Excel will be dropdown only. | Allowed | Allowed | N/A |
| Lookup (single) | N/A | Not Allowed | Not Allowed | N/A |
| Checkbox (Yes/no) | Display as check-box or drop-down | Required (yes or no) | By Definition | None |
| Hyperlink | SharePoint: display as: Hyperlink or Picture Excel: Hyperlink only. | Not Allowed | Allowed | N/A |
| Calculated Columns | Value based on result of formula | Not allowed | Not Allowed | N/A |

The data mapping and data rules described above are enforced and implemented through a validation process. Each data type has specific validation types that make sense, and according to an embodiment, the data source, for example SharePoint, and the data provider application 225 allow users to make changes to the default validation rules described below to customize the validation process. This validation will be performed on the client (spreadsheet application 220) typically, but the database (data source) also may perform the validation process because the client does not always have the latest schema version or validation version.

The validation process occurs at the following three levels, but all are exposed to the user in similar ways:

1. Cell level
2. Row-level (client)
3. Row-level (server)

For cell level validation, for unchanged records, unedited rows will be fully validated by background error checking. For example, say a user has a SharePoint list in Excel. The list is modified to require a column that previously was not required, or a column such as Yes/No that always requires a value is added. When the user attempts to synchronize their spreadsheet with the data source with changes made to data in the spreadsheet, rather than prompting the user for every value in records that were previously written, only those rows that the user modified are validated against allowable data types and data mapping rules. Also, for unchanged records unedited rows are not validated by foreground error checking. But, according to an embodiment of the invention, newly added rows, and changed rows are validated against the data mapping and data type rules. Newly added items are validated by foreground error checking. All Columns in a newly added or changed row are subject to validation whether or not the values have changed.

For cell level validation, a required column that is ignored by the user (left blank) is subject to validation checking and is not allowed. Ignoring or leaving blank a required cell or column would circumvent required data validation for the data source and potentially compromise the data. According to an embodiment, in addition to disabling (or repurposing) the Ignore button, foreground error checking occurs regardless of the data validation setting provisioned by the user, for example in the options dialog >>Tools>Options>>Error Checking>Data validation error.

In addition to validating adherence to required database rules, use of valid data types is also validated. For Choice, data fill-ins are allowed, and multi-select/single select choice may validate properly based on selected items in a data source list. If items selected and delimited are not in the list then validation may fail (providing for the exception on Allow Fill-ins). If all of the items are in the list validation should pass. Data Lookups should validate based on values in the list only. If the value entered by the user is not in the list, then it is a validation error. If the value is in the list then it is acceptable. Cell text should always match at least one item in the complete list. In the case that the text matches more than one item and the cell value was manually entered by the user as opposed to selecting it from a drop down, the first item in the list will always be selected For validation of Hyperlinks, there can be data stored in a hyperlink that may not get published and would get lost without the user knowing what has happened if entry and publish were allowed in a text column. Hyperlinks cannot exceed 255 characters for both the descriptive and hyperlink text each. Hyperlinks are only valid in hyperlink and multi-line text columns.

When there is a restriction on a data field, that restriction may be displayed to the user in an easy to understand fashion. When there is no restriction, the text "No restriction" may be displayed in place of restriction. Table 3 below provides an illustrative list of Field types and corresponding Validation types and displayed messages.

TABLE 3

| Field | Validation types | Message |
|---|---|---|
| Single line of text | Maximum number of characters (1-255) | The value cannot exceed the maximum of <MaxLen> characters. |
| Multiple Lines of text | May or may not allow rich HTML text | The value cannot contain formatted text |
|  | Length exceed 255 on DOC LIB ONLY | The value cannot exceed a maximum of 255 characters. |
| Number | Min and Max set/ Between* | Value must be a number between <Min> and <Max> |
|  | Min set/Greater Than or equal to | Value must be a number greater than or equal to <Min> |
|  | Max set/Less Than or equal to* | Value must be a number less than or equal to <Max> |
|  | Not Between* | Value must be a number not between <Min> and <Max> |
|  | Equal To* | Value must be a number equal to <Reference (if possible)> |
|  | Not Equal To* | Value must be a number not equal to <Reference (if possible)> |
|  | Greater than* | Value must be a number greater than or equal to <Min> |
|  | Less than* | Value must be a number less than or equal to <Max> |
|  | Not a number | Value is not a number |
| Currency | Same as number (except ignores currency sign) | See Number |
|  | Wrong Currency - No alert is shown other than the remark being "Pending." | PENDING |
| Date and Time | Must be a date | Value must be a valid date |
|  | Must be after Dec. 31, 1752, before Jan. 1, 9000 | Value must be a valid date |
|  | Feb. 29, 1900 | No Alert |
|  | Between* | Value must be a date between <Min> and <Max> |
|  | Greater Than or equal to* | Value must be a date greater than or equal to <Min> |
|  | Less Than or equal to* | Value must be a date less than or equal to <Max> |
|  | Not Between* | Value must be a date not between <Min> and <Max> |
|  | Equal To* | Value must be a date equal to <Reference (if possible)> |
|  | Not Equal To* | Value must be a date not equal to <Reference (if possible)> |
|  | Greater than* | Value must be a date greater than or equal to <Min> |
|  | Less than* | Value must be a date less than or equal to <Max> |
| Lookup | Must be among values in lookup | Value must match one of the listed items. |
| Choice | Single - Similar to lookup | Value must match one of the listed items. |
|  | Multiple - Similar to lookup | Value must match one or more of the listed items. |
|  | Will fill in require single line of text validation | No. Choice will need to validate proper delimiters and values + fill-in Choice fields cannot have the characters; # in fill-in values. |

TABLE 3-continued

| Field | Validation types | Message |
|---|---|---|
| Hyperlink | URL must start with one of the following protocols. If not, it is rejected to avoid security holes. (leading spaces should be trimmed) The protocols are: mailto: http:// file:// file:\\\\ ftp:// https:// msn: news: nntp: pnm:// (Real Audio media) mms:// (Media Server media) outlook: | Value is required to be a valid hyperlink and may not exceed a total of 255 characters for description and 225 for URL. |

For row level (client side) validations, validations are related to required fields being blank. The data provider application 225 has information as to which columns are required, and the data provider application enforces the rules when the user commits a row. Table 4 below provides a list of row level (client side) errors and related error messages displayed to the user.

TABLE 4

| Error | Occurs when | Message |
|---|---|---|
| Required field missing | One field isn't filled in | "You must specify a non-blank value for <fieldname>." |
|  | Multiple fields aren't filled in | "You must specify a non-blank value for <fieldname1>, <fieldname2>, and <fieldname3>." |

Row level (server-side) validation is performed at the database (data source) side. If the user has an out-of-date schema (data mapping and data rules model), the user may be unable to make data changes to the data source. Additionally, the user may be restricted from altering the schema to make changes to the data mapping or data type rules. Table 5 below provides and illustrative list of server-side changes and associated effects and displayed messages.

TABLE 5

| Change on server | User change | Effect | Message |
|---|---|---|---|
| Column Add | Add row | No problem (if new column is required, it will sneak by validation - same as SP today) |  |
|  | Delete row | No problem |  |
|  | Change row | No problem |  |
|  | Change view | No problem |  |

TABLE 5-continued

| Change on server | User change | Effect | Message |
|---|---|---|---|
| Column Delete | Add row | No problem unless there is a change to the deleted column. In that case they will get the same warning as a schema conflict message. | Schema conflict message: "The structure of the list has changed on the server. In order to make certain changes you will need to refresh your version of the list. Would you like to refresh now? Note: If you choose not to refresh now, you will be able to refresh later. However, certain types of changes will be disallowed until you refresh." Yes/No buttons provided. |
| | Delete row | No problem | |
| | Change row | No problem unless there is a change to the deleted column. In that case they will get the same warning as a schema conflict message. | Schema conflict message |
| Data Type Change | Add row | No problem unless there is a change to the changed column. In that case they will get the same warning as a schema conflict message. | Schema conflict message |
| | Delete row | No problem unless there is a change to the changed column. In that case they will get the same warning as a schema conflict message. | Schema conflict message |
| | Change row | No problem unless there is a change to the changed column. In that case they will get the same warning as a schema conflict message. | Schema conflict message |

Some database systems, for example Microsoft SharePoint, support fields that return a result for each cell in the field based on a formula. Those formulas can contain a limited set of functions and may only refer to cells in the current list row. Data source formulas may refer to fields or values in the row by use of the field name (an internal unique name). From a user standpoint it looks like the formula is using field captions (the field "name" that the user sees and can change). If the spreadsheet application, for example Microsoft Excel®, supports all of the same functions as the data source, then no conversion is necessary. On the other hand, if the spreadsheet application 220 refers to cells by cell reference rather than by a field or column name or caption, they may have to be converted to a form that the spreadsheet and data source will understand. In order to perform this conversion, a determination is first made as to whether the formula received from the data source is preceded with an equals sign. If so, the equals sign is dropped. Next, the formula is sent through the spreadsheet application's normal formula parsing routines.

The spreadsheet application preferably will treat any field names in the formula as references to labels (better known as defined names). If the parsing routines succeed, a tokenized spreadsheet formula (also known as a parsed expression) is produced. Next, the formula is passed through a conversion routine that looks for label references and matches the label references, if possible, to the field names in the data source list. For each match that is found, the label reference is replaced with a relative cell reference. The resulting formula (or parsed expression) may be populated into the cells of the calculated column. According to one embodiment, the user cannot change the formula of the calculated column in the spreadsheet application. The formula of the calculated column may only be changed on at the data source 235.

Working Offline and Synchronization/Refresh

As described above with reference to FIG. 2, data is passed between the spreadsheet application worksheet and a given data source via a bi-directional communication through the data provider application 225. Although a communication link is established between the spreadsheet and the data source, changes to data in the spreadsheet are made in an "offline" manner where the changes are cached by the data provider application until the user synchronizes the data in the spreadsheet with the data in the data source. When the data is synchronized, the changes are published to the data source as described above to change the corresponding data in the data source. Similarly, the user can at anytime refresh the data, which causes changes made by the user in the spreadsheet to be published to the data source and causes changes made to the data in the data source to be brought into the spreadsheet.

When the data provider application synchronizes with the data source at the server, the data provider application builds a batch of update commands based on the rows in the data source list that have been modified. Each row has an indicator as to whether the row has been modified and which columns have been affected. Based on this information an update command is created and inserted into an update batch that is sent to the server using the UpdateListItems web service call. Based on the response from the web service the conflicts and errors are generated as described below with respect to FIGS. 5 and 6. The following example shows updates to three rows in the data source:

```
<xmldata>
  <Batch OnError="Continue" ListVersion="1" ViewName="
  {270C0508-A54F-4387-8AD0-49686D685EB2}">
    <Method ID="1" Cmd="Update">
      <Field Name="ID">4<Field>
      <Field Name="Name">Jones</Field>
    </Method>
    <Method ID="2" Cmd="Update">
      <Field Name="ID" >6</Field>
      <Field Name="Name>Brown</Field>
    </Method>
    <Method ID="3" Cmd="Update">
      <Field Name="ID">8</Field>
      <Field Name="Name>green</Field>
    </Method>
  </Batch>
</xmldata>
```

In order to allow for proper synchronization of data between the spreadsheet and the data source, tracking of data in the spreadsheet is required. When working with this externally linked data in the spreadsheet, it is necessary to be able to sort, filter and work with the data in ways that making row tracking essential. To accomplish this, a relationship is established between the data provider application and the data in the spreadsheet that is key based instead of location based.

This enables sorting, filtering and deleting that may not have been enabled otherwise. To accomplish this joining between the spreadsheet and the data provider application, an ID field is written into the spreadsheet. This ID field is tied to a particular record in the OLE-DB data provider application and allows a user to make changes in ordering, editing key identity fields in the record and delete rows. According to one embodiment, the spreadsheet application creates a read-only column that contains the key for creating the connection between the spreadsheet and the data provider application. This key then sorts with the row. As should be understood use of the ID field is one implementation, and other methods of establishing a keyed relationship between rows in the spreadsheet and rows in the data provider application may be utilized.

According to an embodiment, the spreadsheet application 220 allows users to modify the order that the columns appear in spreadsheet without changing the order that they appear in the view or the data source. Additionally, the spreadsheet allows users to format the data (with the exception of Formatted Text Fields) without changing the data source. When a data source list is first brought into a spreadsheet according to the present invention, regardless of the method, the field order on the worksheet is set based on the order of the visible fields. This view information is obtained through a call to the data provider application. The spreadsheet application may make changes to the ordering. First, the spreadsheet application always put an OLE-DB bookmark column as the first field. Second, the spreadsheet application handles any calculated fields that are in the visible fields list. For the spreadsheet application to properly handle a calculated field, the spreadsheet application needs to have all the other fields it depends on to be visible.

Once the data source list is in the spreadsheet, the ordering of the fields in the spreadsheet is under user control. The user can make use of the spreadsheet's existing functionality (such as Edit-Cut Edit-Paste or using the mouse to drag cells around) to move/re-order the fields within the data source list. While there is no requirement that the fields be in a particular order, a couple of restrictions do apply. For example, all the fields must stay within the data source list range, and the header cell for all the fields must all be in the same spreadsheet worksheet row. According to an embodiment, pre-existing query table code is used to remember where the user put each field. Changes made to the field ordering in the spreadsheet do not affect the ordering of the fields the user sees in the data source.

When the user synchronizes or refreshes data to a data source list, the order of the fields on the worksheet will not change. However if new fields come in during synchronize/refresh they will be appended to the existing fields on the worksheet. If fields disappear during synchronization or refresh operations, then the fields will be deleted from the worksheet without causing a re-ordering of the rest of the fields. This also is pre-existing query table behavior.

When the user publishes an existing data source list, the spreadsheet application uses the order of the fields as they currently appear on the worksheet. The exception is if the data source list does not have an OLE-DB bookmark column then we will add one and position it before the existing fields. After this point the field ordering is once again all under user control as described above.

According to embodiments, new rows may be added to the data source, existing rows may be edited and existing rows may be deleted by changes made by the user to the spreadsheet worksheet. In each case the data provider application is utilized for tracking changes made and for persisting those changes to the data source.

When a data source list is first brought into a spreadsheet worksheet the cells that the list data are to be put into are cleared of any existing user formatting. Then formatting is applied based on the type of each column. Once the data source list is in the spreadsheet, the user is allowed flexibility in formatting the cells in the data source list. The user applies formatting to the cells through the normal spreadsheet user interface methods such as Format-Cells. This formatting is retained when the data source list is synchronized or refreshed. If new rows come into the data source list during synchronize/refresh operations then formatting will be applied to those cells based on existing formatting in the data source list. Each field in the data source list is evaluated individually, and pre-existing code is run to determine if the rows in a field in question have consistent formatting, and if not, then that formatting is applied to the new cells in that field. According to one embodiment, the user may change the data type of a field in the data source. The spreadsheet application can detect this change and thus apply the appropriate data source list specific formatting. The formatting properties that are set are based on the new data type of the field.

Persistence of the Data Source

According to one embodiment, the spreadsheet has two streams of data to persist when working with editable data including the record source, represented by the data provider application, and the cell table (i.e., the normal spreadsheet data). These streams represent the data in two states, including the information that has been pulled from the data source and marked for changes, and the record of display as represented in the cells of the spreadsheet.

In general, the spreadsheet application writes out the cell data for the data source list, and the data provider application writes out the record set and connection information. The data provider application writes out the entire cached data and schema (data mapping and data type rules) to file in order to support taking an SharePoint List Offline in the spreadsheet application. The data stream is written out as an Extensible Markup Language (XML) file and is compressed to save space. According to one embodiment, the XML format is identical to the SharePoint web services wire format that the data provider application is familiar with. The data provider application exports the list schema, data and pending updates as sections of XML.

A data source list schema section is exactly how it is returned by a SOAP method GetList (see sample XML set out below). A data section is exactly what is returned for a GetListItems (see sample XML set out below) SOAP method. An Updates section contains updates in the same format as the data section with only the changed columns being persisted. For deleted rows only the row ID and version are exported in the XML. For new rows only the changes are written out. Writing out the hidden version is necessary for recognizing conflicts. When a row is updated on data source, its version is incremented. When updates are posted by the data provider application to the data source, the version of the row that the data provider application has is also sent to the data source as part of the update. If there is a mismatch between this version and the current row version on the data source, a conflict is reported and the update for that row is aborted. An STSList element is used as a container to hold the three different sets of data. If the data or update sections are empty or missing, the data provider application will continue to load the list. If the data source list element is missing or empty the data provider application will return an error and abort the data import. The data is exported in the following format:

```
<STSList>
  <List DocTemplateUrl="" DefaultViewUrl="/Lists/testlist/AllItems.aspx"
      ID="{B474B0C0-8B32-4065-83AB-312403198256}" Title="smith"
      Description="testing list" ImageUrl="_layouts/images/itgen.gif"
      Name="{B474B0C0-8B32-4065-83AB-312403198256}" BaseType="0"
      ServerTemplate="100" Created="20011129 18:56:28"
      Modified="20011130 02:06:51" Version="3" Direction="0"
      ThumbnailSize="0" WebImageWidth="0" WebImageHeight="0"
      Flags="0"
      ItemCount="3">
    <Fields>
        <Field ColName="tp_ID" ReadOnly="TRUE" Type="Counter"
      Name="ID"
            PrimaryKey="TRUE" DisplayName="ID"
      FromBaseType="TRUE" />
        <Field Type="Text" Name="Title" DisplayName="Title"
      Required="TRUE"
            FromBaseType="TRUE" ColName="nvarchar1" />
        ...
    </Fields>
  </List>
  <View Name="{A2E29DD9-7FC5-427F-AB41-81713F71F708}"
DefaultView="TRUE"
      Type="HTML" DisplayName="All Items"
Url="Lists/testlist/AllItems.aspx"
    BaseViewID="1">
    <ViewFields>
        <FieldRef Name="Attachments" />
        <FieldRef Name="LinkTitle" />
        <FieldRef Name="currency" />
        <FieldRef Name="smithcalc" />
    </ViewFields>
    <RowLimit Paged="TRUE">100</RowLimit>
    <Query>
        <OrderBy >
            <FieldRef Name="ID" />
        </OrderBy>
    </Query>
    <Formats>
    </Formats>
  </View>
  <Data>
      <xml xmlns:s="uuid:BDC6E3F0-6DA3-11d1-A2A3-00AA00C14882"
          xmlns:dt="uuid:C2F41010-65B3-11d1-A29F-00AA00C14882"
          xmlns:rs="urn:schemas-microsoft-com:rowset"
          xmlns:z="#RowsetSchema">
          <rs:data>
              <z:row ows_ID="3" ows_Title="my funky row b"
                  ows_Modified="2001-11-29 17:47:54"
                  ows_Created="2001-11-29 17:47:54"
            ows_Author="Smith"
                  ows_Editor="Smith" ows_owshiddenversion="0"
                  ows_Attachments="0" ows_EditMenu="3"
                  ows_LinkTitle="my funky row b" />
              <z:row ows_ID="4" ows_Title="my funky row c"
                  ows_Modified="2001-11-29 17:48:00"
                  ows_Created="2001-11-29 17:48:00"
                  ows_Author="Smith"
                  ows_Editor="Smith" ows_owshiddenversion="0"
                  ows_Attachments="0" ows_EditMenu="4"
                  ows_LinkTitle="my funky row c" />
              <z:row ows_ID="5" ows_Title="my funky row d"
                  ows_Modified="2001-11-29 17:48:06"
                  ows_Created="2001-11-29 17:48:06"
            ows_Author="Smith"
                  ows_Editor="Smith" ows_owshiddenversion="0"
                  ows_Attachments="0" ows_EditMenu="5"
                  ows_LinkTitle="my funky row d" />
              ...
          </rs:data>
      </xml>
  </Data>
  <Update>
      <Inserts>
          <xml xmlns:s="uuid:BDC6E3F0-6DA3-11d1-A2A3-
00AA00C14882"
              xmlns:dt="uuid:C2F41010-65B3-11d1-A29F-
```

```
            00AA00C14882"
                xmlns:rs="urn:schemas-microsoft-com:rowset"
                xmlns:z="#RowsetSchema">
            <rs:data>
                <z:row ows_Title="my funky row z" />
            </rs:data>
    </Inserts>
    <Updates>
            <xml        xmlns:s="uuid:BDC6E3F0-6DA3-11d1-A2A3-
    00AA00C14882"
                xmlns:dt="uuid:C2F41010-65B3-11d1-A29F-
                00AA00C14882"
                xmlns:rs="urn:schemas-microsoft-com:rowset"
                xmlns:z="#RowsetSchema">
            <rs:data>
                <z:row ows_ID="3" ows_Title="my funky row updated"
                    ows_owshiddenversion="2" />
            </rs:data>
    /<Updates>
    <Deletes>
            <xml        xmlns:s="uuid:BDC6E3F0-6DA3-11d1-A2A3-
    00AA00C14882"
                xmlns:dt="uuid:C2F41010-65B3-11d1-A29F-
                00AA00C14882"
                xmlns:rs="urn:schemas-microsoft-com:rowset"
                xmlns:z="#RowsetSchema">
            <rs:data>
                <z:row ows_ID="4" ows_owshiddenversion="0" />
            </rs:data>
    </Deletes>
  </Update>
</STSList>
```

For all data source lists, additional information is saved in a spreadsheet XLS regarding data source list properties and data source list field properties. Some of the data source list properties include position on the spreadsheet worksheet, data source list name, whether the data source list is showing its total row, and the like. Some of the data source list field properties include list field caption, data type, type of subtotal aggregate to use when the list's total row is showing, filter settings, formatting settings, etc. For data source data lists, additional list and list field properties are saved. For data source lists, there is additional information stored about the data in the list and changes the user has made to the data. The spreadsheet application is not responsible for this data stream though it is saved in the XLS file. On save, the spreadsheet application asks the data provider application to write this data stream, and on load, the spreadsheet application asks the data provider application to read it.

One concern associated with data communication between the spreadsheet and the data source is the integrity of the row data in a spreadsheet data list linked to a data source list since data changes may be held offline and then may be submitted/committed to the data source later even after the file may have been modified and saved in a different version of the spreadsheet application. Without preservation of the data integrity or if the spreadsheet cannot detect a data integrity violation, then a user could unknowingly submit/commit changes to the data source list that the user did not make or the user may not realize changes that the user made will not actually be submitted/committed. To address this concern a hash value is calculated for each data source list. The hash value is used as a checksum on the data in the data source list. According to one embodiment, a data source list hash value is calculated for a data source at save time using the Microsoft Cryptographic Service Provider.

A hash value is calculated for each row of the data source list based on the data in that row. The hash values for all the rows are combined and furthermore the hash calculated for the data provider application cache stream for this data source list is combined in as well to produce the final "check sum" that is saved with the file. The hash value is calculated for every row whether the user has changed data in that row or not. Furthermore the hash value is calculated on cell data whether that cell has been changed or not.

When a data source list is re-loaded, the hash check sum is recalculated no matter what version of the spreadsheet application saved the file last. The hash is recalculated in the exact same manner as at save time so if the two hash check sum values do not match then it is determined that a data integrity problem exists. When a data integrity problem is detected, the user is prevented from making any further changes to the data source list until the user discards changes and refreshes the data. According to an embodiment of the invention, the hash check sum may be used to detect the following types of data integrity problems: data changes to the data source list in previous versions of the spreadsheet application; a hacked spreadsheet XLS file that changed data in the data source list data range; a hacked data provider application cache stream that changed cached values; a hacked spreadsheet application XLS file or data provider application cache stream that change the hash check sum value; and some structural integrity problems such as removal of one or more columns from the data source list range.

When loading the persisted XML from cache, the data provider application makes some security checks in order to ensure the data has not been tampered with. When writing out the data and updates as part of the XML, the hash for the data and updates is written out in the persisted stream as well. When reloading the data back, the hash is recalculated and if there is a mismatch, the data list will fail to open. This is done to prevent a user from posting data on behalf of another user. The hash is computed using cryptographic API's mentioned above. When the cache is loaded from the data provider application, the updates are not sent to the server right away.

The updates are applied to the cache in-memory locally, and once the user decides to post the updates, they are sent to the data source at the server.

Error Detection and Conflict Resolution

If the data provider application 225 determines that an error condition will arise if the cached data is published or attempted to be published to the specified data source in the database 235, the data provider application 225 will receive from the database 235 error codes associated with any error condition resulting from the attempted publication of data to the database 235. Based on the error codes received by the data provider application 225, one or more data publication errors will be presented to the user via the spreadsheet application 220 to alert the user of the failure to publish the desired data to the database 235.

Figures 5, 6:
FIG. 5 illustrates a table showing a plurality of potential error conditions occurring upon publication of data to a data source according to embodiments of the present invention.
FIG. 6 illustrates a computer screen display showing an illustrative dialog box for resolving conflicts and errors associated with publication of data to a data source according to embodiments of the present invention.

Referring to FIG. 5, a plurality of potential error conditions is illustrated in the error table 500. For example, the "server not found" error 510 may be presented to the user if the data source specified by the user is no longer available to receive data. The "list not found" error 515 may be presented to the user where for some reason the named data list is not found at the specified data source location. The "permissions" error 520 may be presented to the user if the user's permissions for exporting data to the specified data source have been revoked or otherwise modified such that the user is no longer allowed to publish data to the specified data source. The "additional errors" error 525 may include any of a number of potential errors that may be presented upon an attempted publication of data from a spreadsheet application to a specified data source. For example, a separate user of the specified data source may have altered the data source schema such that specified data source locations and fields no longer exist, or where data types published by the user are no longer acceptable.

As should be understood by those skilled in the art, the error conditions listed in the table 500 and the additional errors described herein are by way of illustration only and are not restrictive of the many types of error conditions that may be reported to a user via the data provider application 225. According to embodiments of the invention many of the error messages illustrated in FIG. 5 may have different wordings, including one wording for the publish case which creates a new database/table and a different wording for the case where changes are being published to an existing database/table. For example the following are errors and wordings associated with the publishing changes case:

Server Not Found: Cannot connect to the server at this time. Changes to your data cannot be saved;

Timeout: Cannot connect to the server at this time. Changes to your data cannot be saved;

Server Busy: The server is busy at this time. Changes to your data cannot be saved;

List not Found: The list does not exist. It may have been deleted by another user;

Unanticipated Error: An unexpected error has occurred. Changes to your data cannot be saved;

Permissions: You do not have adequate permissions to modify this list. Changes to your data cannot be saved; and Quota: Your quota for this site has been exceeded. Changes to your data cannot be saved.

Any condition that may prevent the successful publication of data from the spreadsheet application 220 to a specified data source location at the database 235 may result in an error condition being reported to the user, as described above.

In addition to resolution of error conditions, embodiments of the present invention provide for resolution of conflicts created between data being published by the user to the database 235 as compared to data that has previously been published to the same data source location. For example, if the user is publishing data to a data source containing trip report information covering business trips performed by employees of an organization, the user may attempt to publish modified data to a data source location that is in conflict with modifications made to the same data by a different employee of the organization. The other employee of the organization may have modified the trip location data immediately before the attempted publication of modified data by the user, or the user may have performed modifications to the data via the user's spreadsheet application 220 in an offline session followed by an attempt to publish the data to the trip report data source in a subsequent on-line communication. Rather than having the subsequent users data automatically write over the previous user's data, embodiments of the present invention advantageously present the subsequent user with a conflicts resolution dialog such as the dialog box illustrated in FIG. 6 to allow the user to compare the user's data input with the conflicting data input from the previous user.

Referring to FIG. 6, the dialog box 600 includes a field for showing the present user's data changes as compared to the other user's data changes. By way of example, as illustrated in FIG. 6, a city destination 610 shows a data input of "Boston" for the city destination input by the other user's data changes. The present user's data changes include a city destination 615 of "Dallas" which is in conflict with the data input by the other user. Rather than have the second user's data write over the first user's data, the dialog box 600 allows the second user an opportunity to resolve a conflict in the data. If the second user realizes that his changes are erroneous, the user may select the "Discard My Changes" button 620, and the first user's changes will be persisted in the data source of the database 235. On the other hand, if the second user determines that his data changes are correct, the second user may select the "Retry My Changes" button 625 to cause a second user's data changes to write over the first user's data changes.

According to embodiments of the present invention, the second user may be permitted to retry all the second user's changes causing all the second user's changes to write over the previous user's changes. Alternatively, the second user may select to discard all his changes thus leaving all the previous user's changes persisted in the database 235. If the second user desires to discard his changes, but keep his changes persisted in the spreadsheet application worksheet 220, the user may select the "Unlink My List" button 630 which will disconnect the communication link between the spreadsheet application 220 and the database 235 while leaving the second user's data persisted in his spreadsheet application worksheet.

According to an alternative embodiment, the data changes of the subsequent user may be merged with the data changes of the previous user where any conflicting data is resolved by accepting the most recent data change in time.

Figure 7:
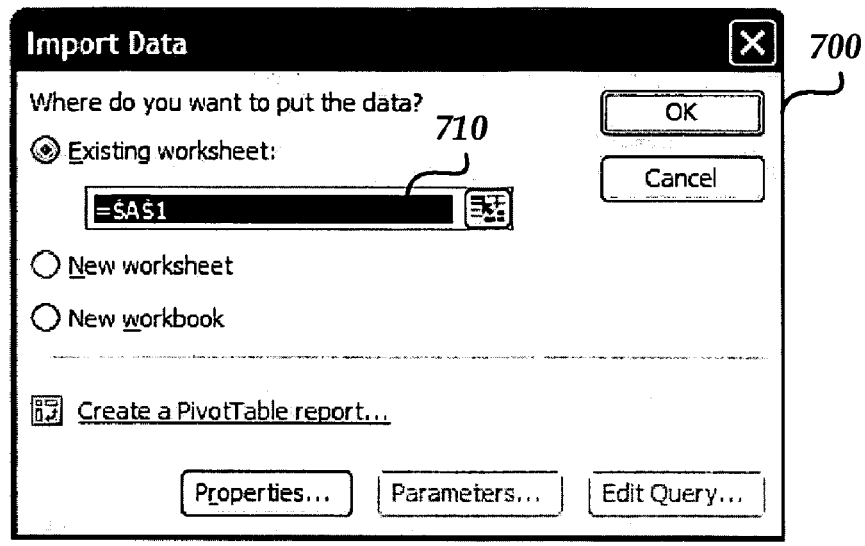
FIG. 7 illustrates a computer screen display showing an illustrative dialog box for importing data from a data source to a spreadsheet application worksheet according to embodiments of the present invention.

As briefly described above, in addition to exporting data from a spreadsheet application worksheet to a data source of the database 235 via the data provider application 225, data may also be imported from a data source to a spreadsheet application worksheet. FIG. 7 illustrates a computer screen display showing an illustrative dialog box for importing data from a data source to a spreadsheet application worksheet according to embodiments of the present invention. Referring to FIG. 7, if the user selects a particular user file from a data source in the database 235 for downloading to the user's spreadsheet application worksheet, the file is downloaded from the data source to the user's local computer 2 and either a presently opened version of the spreadsheet application is utilized or the spreadsheet application is launched automatically.

The downloaded file is opened after preferable security checks and the information is passed through to the spreadsheet application for processing via the data provider application 225. Once the connection data has been passed to the spreadsheet application, the spreadsheet application creates a user interface dialog, such as is illustrated in FIG. 7, for allowing the user to select a location in the spreadsheet application worksheet for importing the downloaded data. As shown in FIG. 7, the dialog box 700 includes a data field for allowing the user to select a location in a given spreadsheet application worksheet for importing the downloaded data. The user may select an existing worksheet, a new worksheet, or a new spreadsheet workbook. Additionally, an option is illustrated in the dialog box in FIG. 7 for allowing the user to create a PivotTable Report instead of a list table. Once the user has selected a location in the spreadsheet application worksheet for importing the data, the spreadsheet application creates an instance of the data provider application and passes the connection information. A "refresh" command to the data provider application 225 may then be used for causing the data to be passed from the data provider application memory cache 245 to the spreadsheet application worksheet as specified by the user.

Figure 8:
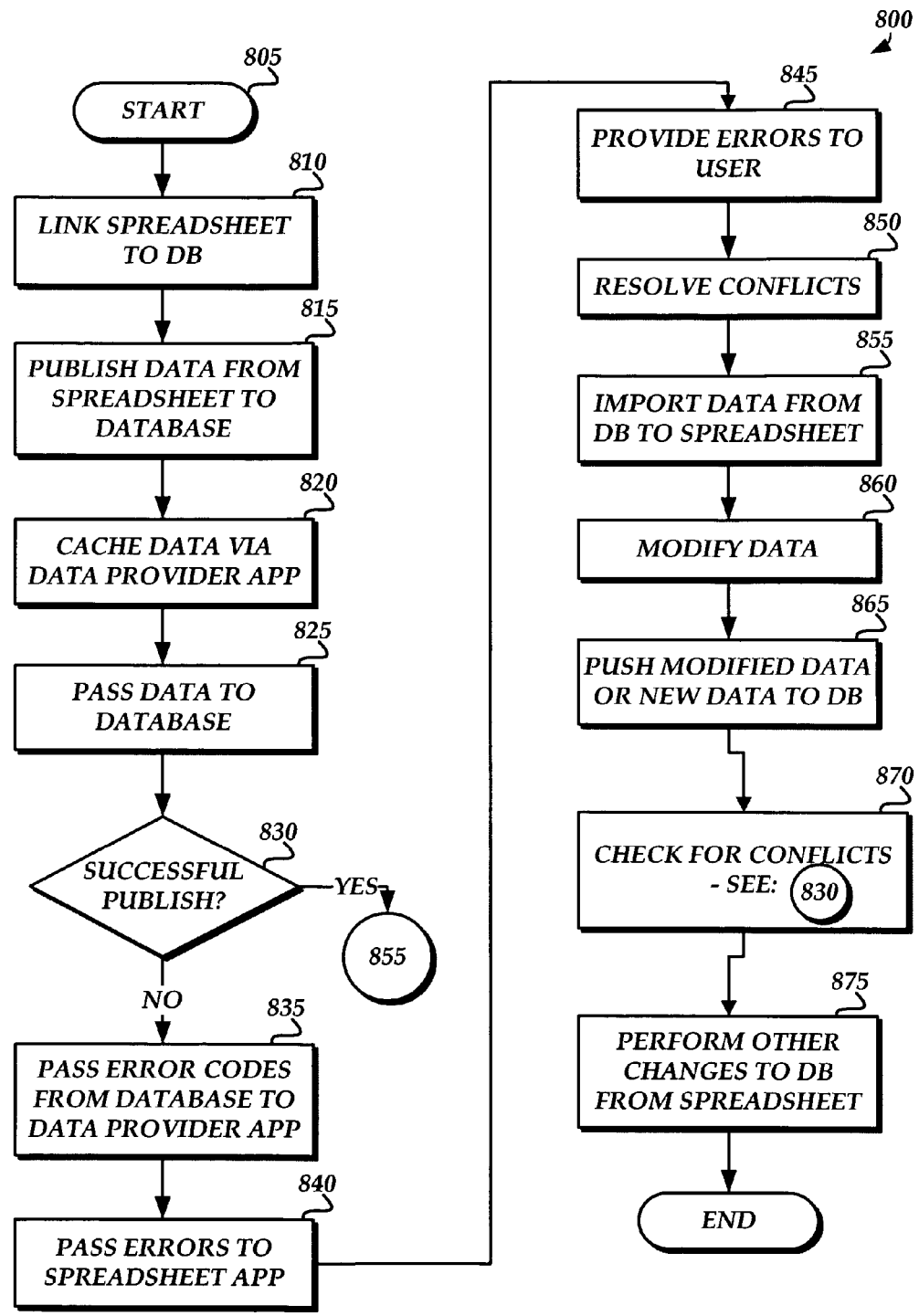
FIG. 8 is a flow diagram showing an illustrative routine for bi-directional communication between a spreadsheet application worksheet and a remote data source.

Having described the functionality and advantages associated with components and embodiments of the present invention above, it is advantageous to describe embodiments of the present invention in terms of an exemplary operation of embodiments of the present invention. FIG. 8 is a flow diagram showing an illustrative routine for bi-directional communication between a spreadsheet application worksheet and a remote data source. The routine 800 begins at start block 805 and proceeds to block 810 where a user prepares to establish a communication link between a spreadsheet application worksheet and a specified data source at a database 235 as described above with reference to FIG. 3. At block 815, the user attempts to establish the data connection by confirming and publishing specified data or data modifications to a specified data source location as described above with reference to FIG. 4. At block 820, data published by the user is cached by the data provider application 225 at the memory cache 245. At block 825, the data provider application 225 attempts to pass the cached data to the data source at the database 235.

At block 825, the data provider application performs a comparison between the data being published by the user with data maintained at the target data source to determine whether any data conflicts will arise. The data provider application 225 also reviews any properties associated with the target data source, such as permission properties that may create an error condition if the user's data is allowed to publish to the target data source. As mentioned above, data publication errors may occur anytime during the publication operation as opposed to only at the beginning of data publication. Most data publication errors, other than data conflicts, prevent the publication operation from continuing to completion. At block 830, a determination is made by the data provider application as to whether the user's data may successfully publish to the target data source. If so, the routine moves to block 855, as described below.

If the user's data may not successfully publish to the target data source, the routine moves to block 835 and error codes are passed from the database 235 to the data provider application associated with any error conditions that arise as a result of the attempted publication of data from the spreadsheet application worksheet to the target data source. At block 840, the data provider application 225 passes errors to the spreadsheet application. At block 845, the spreadsheet application provides the error conditions to the user as described above with reference to FIG. 5. At block 850, the user may resolve any error conditions and retry the publication of data to the target data source. For example, if a "permissions" error is presented to the user, the user may contact her network administrator to have appropriate permissions granted to the user to allow the user to export the desired data from the user's spreadsheet application worksheet to the target data source in the database 235. If the user is presented with data conflicts, such as described above with reference to FIG. 6, the user may resolve those data conflicts by retrying the user's data changes, discarding the user's data changes, or by unlinking the user's spreadsheet application worksheet from the target data source.

If the user successfully connects to the target data source, the routine moves to block 855, and the user may now communicate with the target data source, as described herein. For example, at block 855, the user may import data from a target data source in the database 235 to the user's spreadsheet application worksheet. At block 860, the user may modify the imported data, and at block 865 the user may push the modified data or new data back to the target data source in the database 235. At block 870, the data provider application 225 may once again check for error conditions or data conflicts resulting from the exporting of the modified data back to the target data source at block 865.

At block 875, the user may perform other changes to the target data source in the database 235. For example, as described above, the user may create, edit, and/or delete rows and columns in a given data source. The user may refresh data contained in the user's spreadsheet application worksheet whereby data contained in a linked data source is automatically refreshed to the user's spreadsheet application worksheet. This functionality is useful where a second user may have modified or otherwise updated data contained in a data source linked to the first user's spreadsheet application worksheet where the other user's changes are not presently reflected in the data contained in the first user's spreadsheet application worksheet. The first user may work in an offline environment where her data changes are cached by the data provider application during the offline session. Subsequently, the user may synchronize her spreadsheet application with the data source to export changes made during the user's offline session to a target data source or to import any data changes made to the target data source by other users while the first user was working in an offline session. The user may also unlink her spreadsheet application from a given data source and subsequently publish changes made to data with her local spreadsheet application to the data source after re-establishing a link with the data source.

Offline Multi-Table Data Editing and Storage in a Database Application

As briefly described above, embodiments of the present invention also provide for bi-directional communication between a database application 240 and remote data source 235 via a data provider application 225. According to embodiments, data may be published from a client database application 240 to a remote data source 235 via the data provider application 225. Data may likewise be imported from the data source 235 to the client side database application 240. Bi-directional communication between the client side database application 240 and the remote data source 235 via the data provider application 225, and storage of data in the memory cache 245, illustrated in FIG. 9, is performed in the same manner and according to the same methods described for bi-directional communication between the spreadsheet application 220 and the remote data source 235 described above with reference to FIGS. 2-8.

Figure 9:
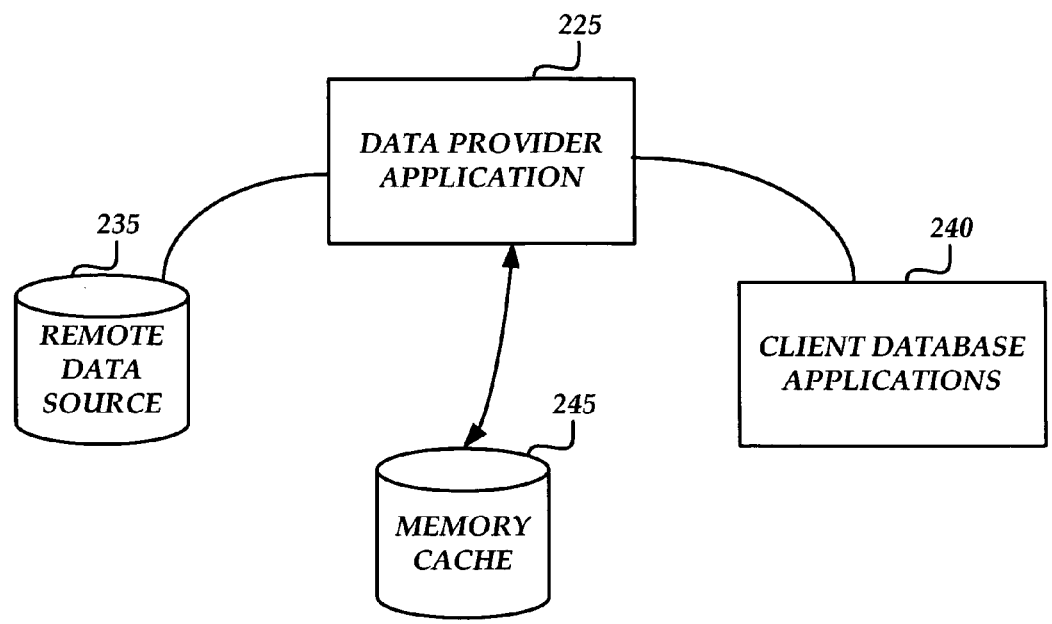
FIG. 9 is a simplified block diagram illustrating interaction between a database application, a data provider application, and a remote data source according to embodiments of the present invention.

FIG. 9 is a simplified block diagram illustrating interaction between a database application 240, a data provider application 225, and a remote data source 235 according to embodiments of the present invention. The database application 240 is illustrative of any suitable database application for storing, organizing, manipulating and presenting various types of data. An exemplary database application for use in accordance with embodiments of the present invention is ACCESS® manufactured by MICROSOFT CORPORATION of Redmond, Wash. The data provider application 225 and the remote data source 235 are described in detail above.

According to embodiments of the present invention, a user may import data from a remote data source by a client side database application via a data provider application for working on the data at the client side application. If a connection between the client application and the remote data source is terminated, the user may continue to edit data stored on the client side, and changes to the data may be published to the remote data source once a connection is reestablished between the client database application 240 and the remote data source 235.

As should be appreciated, a second user may import data from the remote data source to a different client database application for editing the same data being edited by a first user. If the second user publishes changes to the data to the remote data source, followed by a publication of different changes to the same data to the remote data source by the first user, conflicts between the two versions of the data may occur. For example, if two users import a list of data regarding product information of a sales organization, and the two users make different changes to the same data, for example, a first user changes a first product name to the name "green" and the second user subsequently changes the same product name to the name "brown," a version error may occur when the two different users publish changes to the same data back to the remote data source once connections are established between the two different users and the remote data source.

Figure 10:
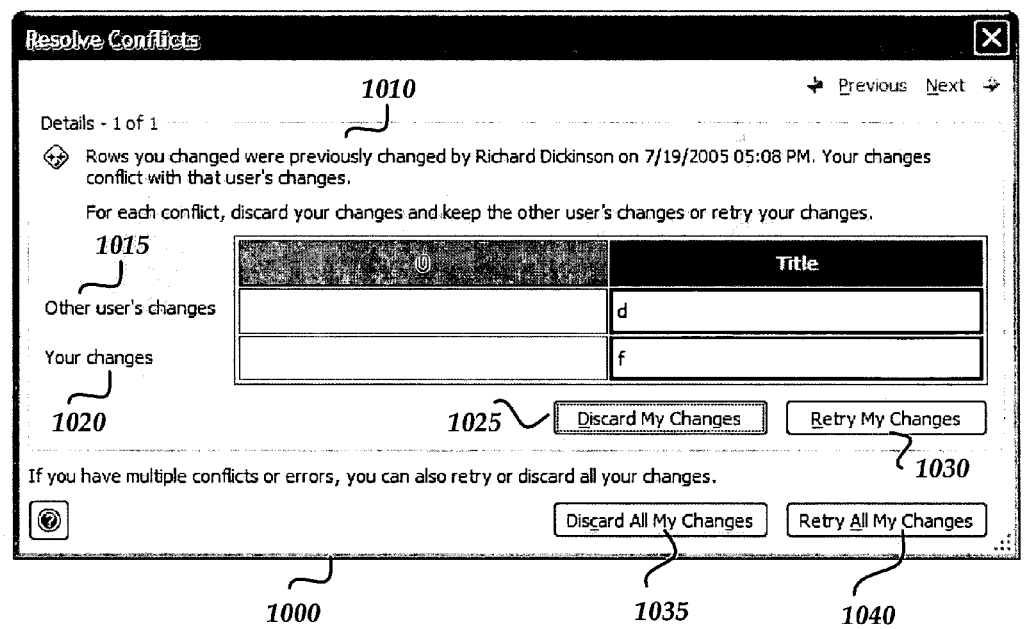
FIG. 10 is an example computer screen display of a conflicts resolution user interface according to embodiments of the present invention.

According to embodiments of the present invention, if a user attempts to. publish changes to one or more data items to the remote data source, and a version error is detected at the remote data source, the client database application 240 will present a conflicts resolution user interface 1000, illustrated in FIG. 10, for notifying the user of the version conflicts. According to one embodiment, an error message such as the error message 1010 may be provided to indicate that rows of data being changed by the present user were previously changed by a different user on a certain date and time and that the changes being made by the present user are in conflict with the changes made by the previous user. Referring still to the user interface 1000, the previous user's changes may be listed in the field 1015, and the present user's changes may be listed in the field 1020. The present user may select the "Discard My Changes" control 1025 for discarding her changes and for keeping the data presently stored at the remote data source in its present state. Alternatively, the "Retry My Changes" control 1030 may be selected for automatically saving the present user's changes to the remote data source in place of the changes made by the previous user. Individual data conflicts may be resolved one at a time, or the user may resolve all data conflicts by selecting the "Discard All My Changes" control 1035 or the "Retry All My Changes" control 1040. As should be appreciated, the user interface 1000, illustrated in FIG. 10, is for purposes of example and illustration only. That is, the conflicts resolution dialog or user interface 1000 may be presented according to a number of different layouts and orientations, and thus, the layout of the user interface 1000, illustrated in FIG. 10, is not limiting or restrictive of the invention as claimed herein.

Figure 11:
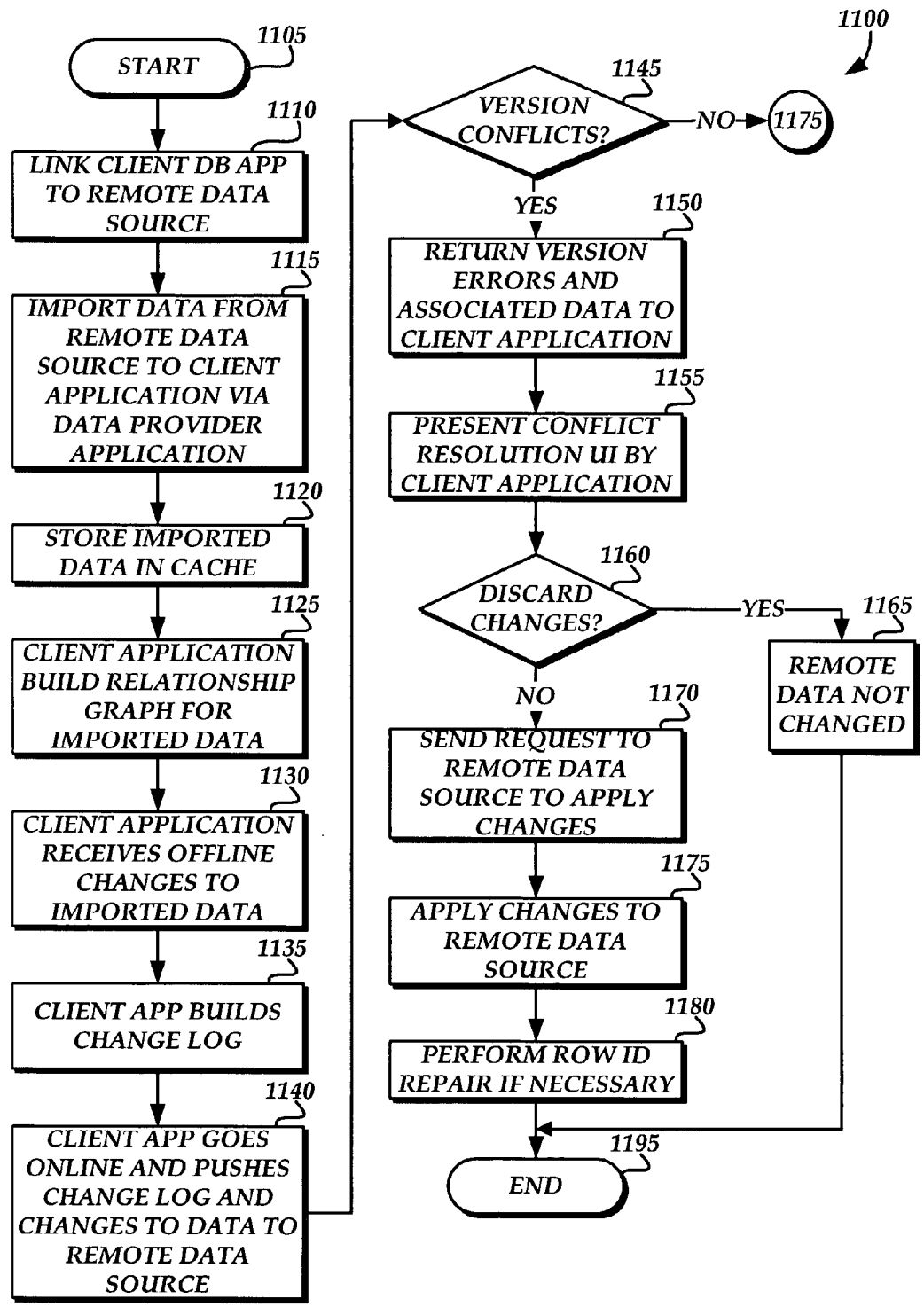
FIG. 11 is a logical flow diagram showing an illustrative routine for bi-directional communication and data source write back between a database application and a remote data source.

FIG. 11 is a logical flow diagram showing an illustrative routine for bi-directional communication and data source write back between a database application and a remote data source. For purposes of illustration, embodiments of the present invention will be described below with reference to an example set of data imported from a remote data source 235 by a client side database application 240 for operating on the imported data during an offline editing session. For purposes of example, the imported data includes multiple lists of related data including a product name list containing the names of various products, a related product orders list, and a related product order details list. Referring then to FIG. 11, the routine 1100 begins at start operation 1105 and proceeds to data connection operation 1110 where the client database application 240 is connected to the remote data source 235 for importing data from the remote data source 235 via the data provider application 225, as described above with reference to FIGS. 2-9.

As should be appreciated, the connection between the client database application 240 and the remote data source 235 may be over a distributed computing network such as the Internet or via an intranet, such as an organization intranet connecting one or more client applications to a remote data source at a remote server. Once the client database application is connected to the remote data source, a user may operate on data contained on the remote data source during the online connection between the client database application and the remote data source. During the connection, changes made to data via the client database application are persisted to the data contained on the remote data source 235.

At import data operation 1115, data from the remote data source 235 is imported by the client database application 240 via the data provider application 225 to a client side storage location. For purposes of example, as described above, consider that a user imports three related lists of data including a first list of data containing product names, a second related list of data containing product orders, and a third list of related data containing product order details, for example, product order delivery dates, quantities, prices, etc.

According to an embodiment of the present invention, when data is imported from the remote data source to a client side storage site via the data provider application, the data is passed to the client database application formatted according to the Extensible Markup Language (XML). As is well known to those skilled in the art, the Extensible Markup Language allows for structuring the data imported from the remote data source according to self-describing tags which are defined according to a schema associated with the data that governs the grammatical and syntax rules associated with the XML structure applied to the data. For example, a tag known as <productname> may be wrapped around all product names. A tag known as <productorder> may be wrapped around product orders, and variety of product order details tags, for example <price>, <quantity>, and the like may be wrapped around various product order details data items. A schema associated with the XML structured data at the remote data source 235 is passed with the imported XML structured data to the client side for allowing the client database application 240 to read, understand, and utilize the imported data according to the associated schema that provides definition for each of the XML tags associated with individual data items contained in the imported data.

At data storage operation 1120, the imported data is stored by the client database application 240 in a database table maintained on the client-side computing device 2. The stored data along with the XML description and associated schema for the stored data is designated as a database object by the client database application 240 so that if a connection between the client database application 240 and the remote data source is lost, the client database application 240 will know where to locate the data stored on the client side.

At operation 1125, the client database application 240 builds a relationship graph or tree for the imported data for tracking the relationships between the different lists of related data imported to the client side. For example, if a first list, for example, product names, is imported, and a second list, for example, product orders, depends from the first list, the relationship graph built by the client database application 240 will show that the product orders list is hierarchically related to the product names list as a child list to the product names list. Moreover, if the product order details list is imported, the relationship graph or tree will show that the product order details list is hierarchically dependent from the product orders list, or is a child list to the product orders list.

If during the data import operation 1115, a user imports data from a given list, for example, the product orders list, the client database application 240 will parse a lookup column on the remote data source to determine whether the imported list of data is dependent upon a related list of data, for example, product names list, that will be needed by the client database application 240 for working offline on the client side. That is, if a user only imports a single list of data, but that list of data is related to a parent or sibling list of data that will be needed for making changes to the desired list of data, then the client database application 240 will import all required data lists for storage on the client side for offline data editing or entry. Once the desired list of data and any required related lists are imported to the client side, the relationship graph or tree is generated by the client database application 240, as described above.

At offline operation 1130, the client database application 240 goes offline from the remote data source 235. As should be appreciated by those skilled in the art, the offline operation may be initiated because a user disconnects the client database application from the remote data source, or because a data connection between the client application 240 and the remote data source is temporarily terminated due to technical difficulties. For example, a user may disconnect a laptop computer from a docking station for taking the laptop and stored data to a different location, and the user may wish to work on stored data while in transit to the different location. For another example, an Internet service provider may have a temporary malfunction causing a connection termination between the client application 240 and the remote data source 235.

Upon detection of an intended or unintended loss of connection between the client database application 240 and the remote data source 235, the client database application 240 parses the local data storage for the data stored from the remote data source 235. At operation 1135, the client application 240 generates a change log for logging changes made to the stored data so that changes to the stored data may be published back to the remote data source 235 once a connection between the client database application 245 and the remote data source is reestablished. According to embodiments of the present invention, the change log will identify each row of data contained in the database object table previously stored by the client database application and will log any changes made to data stored therein.

At operation 1140, changes are made to the stored data during the offline database operation and once the client application is reconnected with the remote data source 235, the data changed during the offline operation and the associated change log are published to the remote data source 235 in response to a synchronization command received by the client database application 240. As should be appreciated, according to one embodiment, data and the associated change log are automatically published to the remote data source upon detection by the client application 240 that a connection between the client application 240 and the remote data source has been reestablished. Alternatively, once a connection between the client application 240 and the remote data source is reestablished, publication of edited data and the associated change log to the remote data source is performed manually upon receipt of a synchronization command at the client database application 240. As should be appreciated, a user interface may be provided by the client database application 240 that provides a selectable control for synchronizing data edited during an offline data editing session with associated data maintained on the remote data source.

At decision operation 1145, a determination is made at the remote data source as to whether data published to the remote data source from the client database application 240 creates version conflicts with data presently stored at the remote data source 235. For example, consider that a first row of data in a list of data edited by the user in an offline session includes a row identification of "1," a product name of "jam," and a version of "1." A second row of data includes a row identification of "2," a product name "butter," and a version of "2." If the user edits the first row of data during the offline session such that the first row ID still equals "1," the product name now equals "honey" instead of "jam," and version is still equal 1, then when the edited data is published to the remote data source, no version conflict will be detected because the first row of data remains as version "1" even through the product name has been changed from "jam" to "honey." That is, because the data for this row of data was version "1" when the user imported the data to the client side, and because no interim changes have been made to the data at the remote data source to change the data to version "2," for example, then the change in the data published to the remote data source may be automatically accepted at the remote data source without conflict. If no version conflict is detected at decision block 1145, the routine proceeds to block 1175, and changes to the data are applied to the remote data source as described below.

Referring back to the decision block 1145, consider now, for example, that during the interim between the first user's changes to the offline data and the attempt to publish the changes to the remote data source, a second user made changes to the same data and published those changes to the remote data source such that the second row of data including the product name "butter" has been changed to product name "peanut butter" and the version at the remote data source has been updated from version "2" to version "3." If the first user changes the product name from "butter" to "margarine" during the offline editing session and attempts to publish the changed data to the remote data source once a connection is reestablished, the first user will attempt to publish row ID equals "2," product name equals "peanut butter," and version "2" because the version at the remote data source was version "2" at the time the data was imported to the client side. Now, when the data is published to the remote data source, a determination is made that the version "2" being published by the first user is in conflict with the current version "3" for the information contained in row ID "2." As a result, the routine proceeds to version error operation 1150, and a version error and associated data are returned to the client database application 240.

At conflict resolution operation 1155, the user interface 1000, illustrated in FIG. 10, is presented by the client database application 240 to alert the user that a conflict has occurred between the user's data and data presently stored at the remote data source. Continuing with the present example, the user will be notified that a previous user changed the product name for row ID "2" from "butter" to "peanut butter" which is in conflict with the current user's attempt to change the product name for row ID 2 from "butter" to "margarine."

At decision block 1160, a determination is made as to whether the user's changes should be discarded or whether the user's changes should be published to the remote data source to replace data presently stored on the remote data source. If the user decides to discard her changes, the routine proceeds to block 1165, and the data at the remote data source is not changed. The routine then proceeds to block 1195 and ends. Alternatively, if the user decides to publish her changes to the remote data source, the routine proceeds to block 1170, and a request is passed from the client database application 240 to the remote data source to apply the changes made by the user, for example, product name from "butter" to "margarine." At operation 1175, the changes published to the remote data source by the user are made to the data contained on the remote data source.

As described above, when data is stored at the client side by the client database application 240, a relationship tree or graph is generated for tracking relationships between related lists of data. According to embodiments of the present invention, when data is published from the client side to the remote data source as described above, data is published to the remote data source hierarchically according to the relationship graph or tree generated for the stored and edited data. For example, if data is edited for the product orders list, but data for the product names list is not edited, when the edited product orders data is published to the remote data source, the client database application 240 will parse the relationship tree for the stored data to determine that the product orders data is hierarchically related to product names such that product orders is a child data list of product names. Thus, before the client database application 240 publishes edited product orders data, the application 240 will first determine the parent product names data for a given product orders data so that the edited products order data is published with the parent product names data to the remote data source so that the relationship between the edited product orders data and its parent product name data is maintained.

According to embodiments of the present invention, during the offline editing session, new rows of data may be entered. For example, the stored offline data may include three rows of data for products of "jam," "butter," and "margarine," respectively. If during the offline editing session, a new row of data is added to the list, for example, a fourth row of data for "sandwich spread," a temporary row identification will be applied to the added row of data. According to one embodiment, a negative integer, for example, "−1" is utilized for identifying the new row of data to prevent conflicts with presently stored rows of data on the client side.

At row ID repair operation 1180, after edited or added data is published to the remote data source once a connection between the client database application 240 is reestablished with the remote data source, temporary row identifications are repaired by the client database application 240 after a determination is made that no version conflicts exist for the edited or added data. For example, if a new row of data, for example, "sandwich spread," is entered and is provided a temporary row ID of "−1," once a determination is made that no version conflicts exist, or once any version conflicts that exist are resolved, the client database application 240 will replace the temporary row IDs with permanent row IDs so that row IDs in the persisted data on the remote data source are properly sequenced. For example, if the next available row ID in the remote data source is row ID "4," then the temporary row ID of "−1" applied to the new row of data, for example, "sandwich spread" will be repaired to a row ID "4." Once all edited or added data is published to the remote data source, and once all conflicts are resolved and temporary row identifications are repaired, as described herein, the routine ends at block 1195.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of bi-directional communication between a database application and a remote data source, comprising:
   receiving data at the database application from the remote data source;
   storing the data at the database application;
   building a relationship graph at the database application for representing a hierarchical relationship between a first portion of the stored data with a second portion of the stored data, the first portion of the stored data having a parent data list and the second portion of the stored data comprising a child data list;
   receiving a termination of a connection between the database application and the remote data source;
   receiving changes only to the second portion of the stored data at the database application;
   generating a change log at the database application representing changes made to the second portion of the stored data;
   receiving a connection between the database application and the remote data source; and
   publishing the changed second portion of the stored data from the database application to the remote data source for replacing corresponding data at the remote data source with the changed second portion of the stored data, wherein the changes to the second portion of the stored data comprising the child data list are published with the unchanged first portion of the stored data comprising the parent data list so as to maintain a pre-existing parent-child relationship between the parent data list and the child data list.

2. The method of claim 1, whereby receiving the data at the database application includes receiving the data at the database application formatted according to the Extensible Markup Language.

3. The method of claim 1, whereby storing the data at the database application includes storing the data as a database object comprising one or more rows of data.

4. The method of claim 1, wherein building a relationship graph at the database application for representing a relationship between a first portion of the data with a second portion of the data includes building a relationship graph at the database application for representing a hierarchical relationship between a first list of data with a second list of data, the first and second lists of data included in the stored data.

5. The method of claim 4, wherein building a relationship graph at the database application includes parsing a lookup table at the remote data source for determining hierarchical relationships between the first list of data and the second list of data.

6. The method of claim 5, wherein publishing the changed stored data to the remote data source includes publishing the change log to the remote data source for providing a representation of changes made to the stored data.

7. The method of claim 1, further comprising, at the database application, receiving a notification that a version of the published data is in conflict with a version of corresponding data maintained at the remote data source that will be replaced by the published data if the published data is saved to the remote data source.

8. The method of claim 7, wherein receiving the notification includes receiving a notification of the content of the corresponding data maintained at the remote data source that will be replaced by the published data if the published data is saved to the remote data source.

9. The method of claim 8, wherein receiving the notification further includes receiving a notification of an author of the corresponding data that will be replaced by the published data if the published data is saved to the remote data source.

10. The method of claim 9, wherein receiving the notification further includes receiving information as to a time the corresponding data was published to the remote data source.

11. The method of claim 7, further comprising replacing the corresponding data with the published data.

12. The method of claim 7, in response to receiving a notification that a version of the published data is in conflict with a version of corresponding data maintained at the remote data source that will be replaced by the published data if the published data is saved to the remote data source, discarding the published data such that the corresponding data is not changed.

13. The method of claim 1, further comprising receiving one or more new rows of data added to the stored data at the database application.

14. The method of claim 13, further comprising applying a temporary identification to any new row of data added to the stored data at the database application.

15. The method of claim 14, wherein publishing the changed stored data from the database application to the remote data source for replacing corresponding data at the remote data source with the changed stored data includes replacing any temporary identifications applied to any new row of data added to the stored data at the database application with permanent row identifications at the remote data source.

16. A computer readable medium containing computer executable instructions which when executed by a computer perform a method of publishing data from a client side database application to a remote data source, comprising:
receiving one or more lists of data at the database application from the remote data source;
storing the one or more lists of data at the database application;
building a relationship graph at the database application for representing a hierarchical relationship between a first list of the one or more lists of data with a second list of the one or more lists of data, the first list of the one or more lists of data comprising a parent data list of product names data and the second list of the one or more lists of data comprising a child data list of product orders data;
receiving a termination of a connection between the database application and the remote data source;
receiving changes only to the stored second list of the one or more lists of data at the database application;
generating a change log at the database application representing changes made to the stored second list of the one or more lists of data;
receiving a connection between the database application and the remote data source; and
publishing the changed stored second list of the one or more lists of data to the remote data source according to the relationship graph such that the changed stored second list is published to the remote data source according to the hierarchical relationship imposed by the relationship graph, wherein changes to the child data list of product orders data comprising the changes to the stored second list are published with the unchanged parent data list of product names data comprising the first list so as to maintain a pre-existing parent-child relationship between the parent data list of product names data and the child data list of product orders data.

17. The computer readable medium of claim 16, wherein publishing the changed stored second list of the one or more lists of data to the remote data source includes publishing the change log to the remote data source for providing a representation of changes made to the stored second list of the one or more lists of data.

18. A computer readable medium containing computer executable instructions which when executed by a computer perform a method of publishing data from a client side database application to a remote data source, comprising:
receiving one or more lists of data at the database application from the remote data source;
storing the one or more lists of data at the database application;
building a relationship graph at the database application for representing a hierarchical relationship between a first of the one or more lists of data with a second of the one or more lists of data, the first list of the one or more lists of data comprising a parent data list and the second list of the one or more lists of data comprising a child data list;
receiving changes only to the stored second list of the one or more lists of data at the database application while the database application is not connected to the remote data source;
publishing the changed stored second list of the one or more lists of data to the remote data source according to the relationship graph such that the changed stored second list is published to the remote data source according to the hierarchical relationship imposed by the relationship graph, wherein changes to the child data list comprising the changes to the stored second list are published with the unchanged parent data list comprising the first list so as to maintain a pre-existing parent-child relationship between the parent data list and the child data list; and
receiving a notification that a version of the published one or more lists of data is in conflict with a version of corresponding data maintained at the remote data source that will be replaced by the published one or more lists of data if the published one or more lists of data are saved to the remote data source.

* * * * *